United States Patent
Abdoli et al.

(10) Patent No.: US 10,700,837 B2
(45) Date of Patent: Jun. 30, 2020

(54) GROUP COMMON CONTROL CHANNEL

(71) Applicant: Huawei Technologies Co., Ltd., Shenzhen (CN)

(72) Inventors: Javad Abdoli, Kanata (CA); Zhenfei Tang, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 14 days.

(21) Appl. No.: 15/937,559

(22) Filed: Mar. 27, 2018

(65) Prior Publication Data
US 2018/0287750 A1   Oct. 4, 2018

Related U.S. Application Data

(60) Provisional application No. 62/480,075, filed on Mar. 31, 2017.

(51) Int. Cl.
*H04L 5/00* (2006.01)
*H04W 72/04* (2009.01)

(52) U.S. Cl.
CPC ............ *H04L 5/005* (2013.01); *H04L 5/0053* (2013.01); *H04L 5/0094* (2013.01);
(Continued)

(58) Field of Classification Search
CPC .............. H04L 5/005; H04W 72/0453; H04W 72/0446; H04W 72/042; H04W 72/0406;
(Continued)

(56) References Cited

U.S. PATENT DOCUMENTS 10,028,210 B1 * 7/2018 Nammi ................ H04L 1/0072
2014/0177547 A1   6/2014 Guo et al.
(Continued)

FOREIGN PATENT DOCUMENTS

CN   102724757 A   10/2012
CN   103096379 A   5/2013
(Continued)

OTHER PUBLICATIONS

"Summary of E-Mail Discussions on Downlink Control Signaling," TSG-RAN WG1 NR AdHoc, R1-1701036, Jan. 2017, 18 pages, Spokane, WA.
(Continued)

*Primary Examiner* — Maharishi V Khirodhar
*Assistant Examiner* — Kenneth P Hunt
(74) *Attorney, Agent, or Firm* — Slater Matsil, LLP

(57) ABSTRACT

Methods and systems for group common control channel implementation and use are provided. An embodiment a method in a base station for signaling group common control channel information is provided. The method includes determining control information common to a group of user equipment (UEs), the control information comprising time-frequency locations for at least one of a plurality of data channels and a plurality of control channels. The control information formatted in a Downlink Control Information (DCI) format. The method also includes encoding the control information in a group common control channel to generate encoded control information. The method also includes transmitting the encoded control information to the group of UEs.

20 Claims, 9 Drawing Sheets

(52) U.S. Cl.
CPC ..... *H04W 72/042* (2013.01); *H04W 72/0446* (2013.01); *H04W 72/0453* (2013.01)

(58) Field of Classification Search
CPC ......... H04W 72/1289; H04W 72/1294; H04W 72/121
See application file for complete search history.

(56) References Cited

U.S. PATENT DOCUMENTS

| | | | |
|---|---|---|---|
| 2014/0204883 A1* | 7/2014 | Lee | H04L 1/1861 370/329 |
| 2014/0241234 A1 | 8/2014 | Zhu et al. | |
| 2015/0245350 A1* | 8/2015 | Webb | H04L 5/0007 370/329 |
| 2016/0135146 A1* | 5/2016 | Schier | H04W 72/121 370/312 |
| 2018/0124727 A1* | 5/2018 | Baldemair | H04W 48/12 |
| 2018/0152964 A1* | 5/2018 | Sun | H04W 72/042 |
| 2018/0183551 A1* | 6/2018 | Chou | H04W 72/044 |
| 2018/0234950 A1* | 8/2018 | Sun | H04L 5/0094 |
| 2018/0279289 A1* | 9/2018 | Islam | H04W 72/1242 |

FOREIGN PATENT DOCUMENTS

| | | |
|---|---|---|
| CN | 103857041 A | 6/2014 |
| CN | 105051697 A | 11/2015 |
| WO | 2014142464 A1 | 9/2014 |

OTHER PUBLICATIONS

Catt, "Further details of group-common control", 3GPP TSG RAN WG1 Meeting #88bis, R1-1704572, Apr. 3-7, 2017, 6 Pages, Spokane, USA.

Huawei, et al., "Group-common NR-PDCCH", 3GPP TSG RAN WG1 Meeting #88bis, R1-1704205, Apr. 3-7, 2017, 4 Pages, Spokane, USA.

* cited by examiner

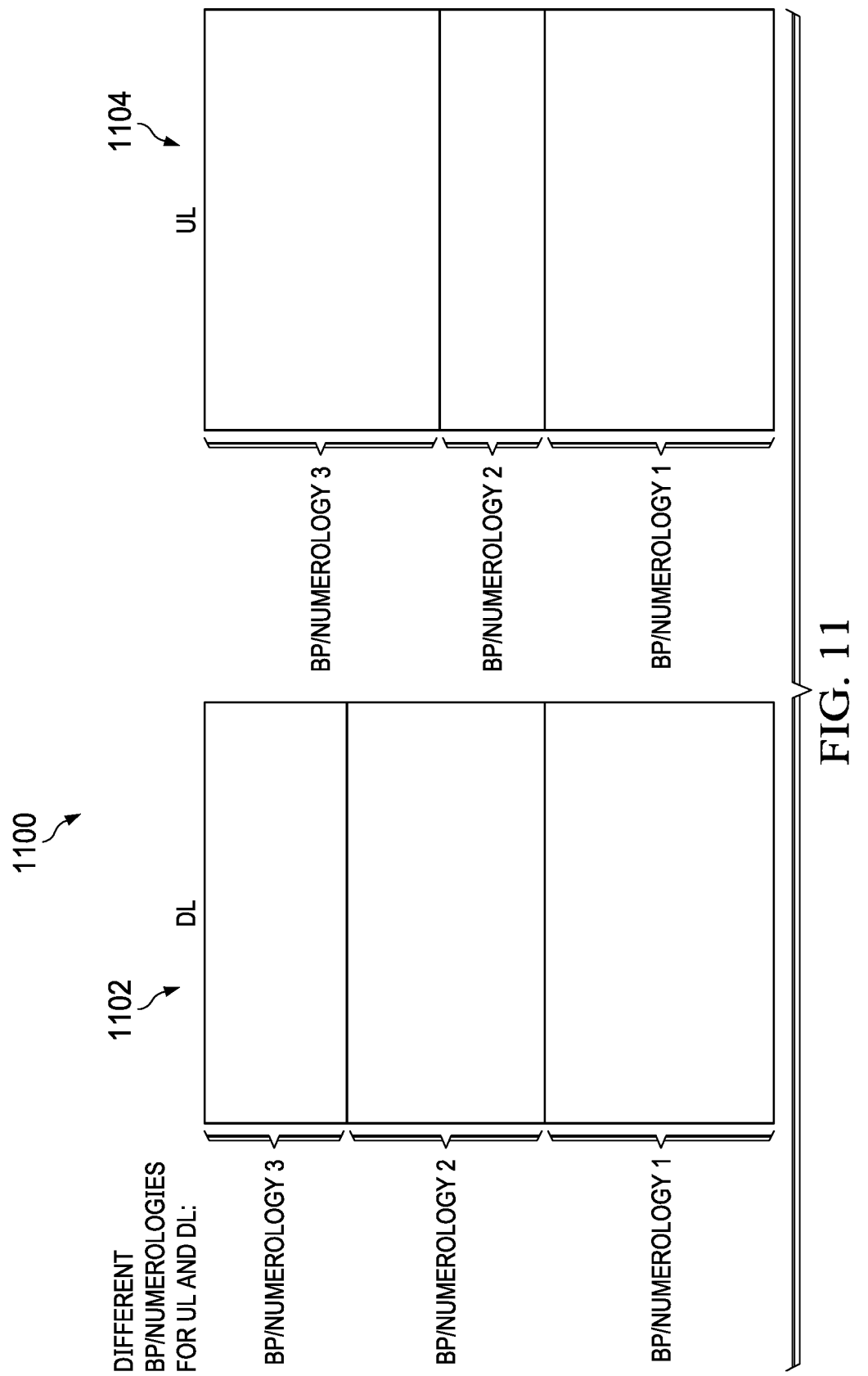

GROUP COMMON CONTROL CHANNEL

This application claims priority to U.S. Provisional Application Ser. No. 62/480,075, filed on Mar. 31, 2017, titled "Group Common Control Channel," which application is hereby incorporated by reference in its entirety.

TECHNICAL FIELD

The present invention relates generally to a system and method for wireless communications, and, in particular embodiments, to a system and method for control signaling.

BACKGROUND

To support the transmission of downlink (DL) and uplink (UL) transport channels DL and UL shared channel control signaling is required. This control signaling enables a user equipment (UE) to successfully receive, demodulate, and decode information received on the DL channel. Downlink Control Information (DCI) is transmitted through the Physical Downlink Control Channel (PDCCH) and includes information about the DL resource allocation, transport format and other information.

Recently, a group common PDCCH to provide control information common to a group of UEs has been proposed for 5G. However, because 5G may include many more numerology and bandwidth structures than LTE, the PDCCH structure used for LTE is not suitable for 5G. Therefore, a new group common PDCCH structure and implementation methods and systems are necessary.

SUMMARY

According to one aspect of the present disclosure, there is provided a method in a base station for signaling group common control channel information. The method includes determining control information common to a group of user equipment (UEs), the control information comprising time-frequency locations for at least one of a plurality of data channels and a plurality of control channels. The control information formatted in a Downlink Control Information (DCI) format. The method also includes encoding the control information in a group common control channel to generate encoded control information. The method also includes transmitting the encoded control information to the group of UEs.

According to one aspect of the present disclosure, there is provided a method in a base station for signaling group common Physical Downlink Control Channel (PDCCH) information. The method includes determining control information common to a group of user equipment (UEs). The control information includes group-scheduling information, resource configuration for downlink (DL) channel measurement, resource configuration for uplink (UL) channel measurement, group power control, and a group Ack/Nack for UL transmission by the UE-group. The control information is formatted in a Downlink Control Information (DCI) like format. The method also includes encoding the control information in a group common PDCCH to generate encoded control information. The method also includes transmitting the encoded control information to the group of UEs.

According to one aspect of the present disclosure, there is provided a base station for signaling group common control channel information. The base station includes a non-transitory memory storage comprising instructions and one or more processors in communication with the memory, wherein the one or more processors execute the instructions. The instructions include instructions for determining control information common to a group of user equipment (UEs), the control information comprising time-frequency locations for at least one of a plurality of data channels and a plurality of control channels. The control information is formatted in a Downlink Control Information (DCI) format. The instructions also include instructions for encoding the control information in a group common control channel to generate encoded control information. The instructions also include instructions for transmitting the encoded control information to the group of UEs.

According to one aspect of the present disclosure, there is provided a base station for signaling group common control channel information. The base station includes a non-transitory memory storage comprising instructions and one or more processors in communication with the memory, wherein the one or more processors execute the instructions. The instructions include instructions for determining control information common to a group of user equipment (UEs). The control information includes group-scheduling information, resource configuration for downlink (DL) channel measurement, resource configuration for uplink (UL) channel measurement, group power control, and a group Ack/Nack for UL transmission by the UE-group. The control information is formatted in a Downlink Control Information (DCI) like format. The instructions also include instructions for encoding the control information in a group common control channel to generate encoded control information. The instructions also include instructions for transmitting the encoded control information to the group of UEs.

According to one aspect of the present disclosure, there is provided a method in a user equipment (UE) for receiving group common control channel (GCCCH) information. The method includes receiving, at the UE, signaling from a base station. The signaling indicates an encoded control information. The encoded control information is encoded with a control information in a group common control channel. The control information includes time-frequency locations for at least one of a plurality of data channels and a plurality of control channels. The control information is formatted in a Downlink Control Information (DCI) format.

According to one aspect of the present disclosure, there is provided a user equipment (UE) for receiving group common control channel information. The UE includes a non-transitory memory storage comprising instructions and one or more processors in communication with the memory. The one or more processors execute the instructions for receiving signaling from a base station, a signaling indicating an encoded control information. The encoded control information is encoded with a control information in a group common control channel. The control information includes time-frequency locations for at least one of a plurality of data channels and a plurality of control channels. The control information is formatted in a Downlink Control Information (DCI) format.

Optionally, in any of the preceding aspects, another implementation of the aspect provides that the time-frequency location comprises a resource set indication.

Optionally, in any of the preceding aspects, another implementation of the aspect provides that the time-frequency location of a group common Physical Downlink Control Channel (PDCCH) is signaled to the group of UEs using a radio resource control (RRC) message or a System Information Block (SIB) message.

Optionally, in any of the preceding aspects, another implementation of the aspect provides that the time-frequency information includes any one of a resource set indication a default numerology, or a configurable numerology.

Optionally, in any of the preceding aspects, another implementation of the aspect provides that the group of UEs is associated with a UE group ID, wherein the UE group ID is signaled to the group of UEs in a radio resource control (RRC) message.

Optionally, in any of the preceding aspects, another implementation of the aspect provides that the method further includes receiving, by the UE, a UE group identifier (ID) in a radio resource control (RRC) message, and the UE group ID is associated with a group of UEs.

Optionally, in any of the preceding aspects, another implementation of the aspect provides that at least a portion of the encoded control information is transmitted in an L1 signaling message.

Optionally, in any of the preceding aspects, another implementation of the aspect provides that the time-frequency location of the group common control channel is signaled to the group of UEs using RRC message or SIB message.

Optionally, in any of the preceding aspects, another implementation of the aspect provides that the time frequency information comprises a resource set indication.

Optionally, in any of the preceding aspects, another implementation of the aspect provides that the time-frequency information comprises a default numerology.

Optionally, in any of the preceding aspects, another implementation of the aspect provides that the time-frequency information comprises a configurable numerology.

Optionally, in any of the preceding aspects, another implementation of the aspect provides that the numerology includes at least one of subcarrier spacing, cyclic prefix (CP) length, and transmission time interval (TTI) length.

Optionally, in any of the preceding aspects, another implementation of the aspect provides that the control information further comprises a bandwidth part and a numerology structure.

Optionally, in any of the preceding aspects, another implementation of the aspect provides that the bandwidth part and the numerology structure are different for downlink and uplink.

Optionally, in any of the preceding aspects, another implementation of the aspect provides that the bandwidth part and the numerology structure are the same for downlink and uplink.

Optionally, in any of the preceding aspects, another implementation of the aspect provides that the bandwidth part and the numerology structure are partially signaled in the group common PDCCH and partially signaled in a System Information Block (SIB).

Optionally, in any of the preceding aspects, another implementation of the aspect provides that a UE group is determined according to UEs within a beam.

Optionally, in any of the preceding aspects, another implementation of the aspect provides that the group of UEs is associated with a UE group ID, the UE group ID determined according to a beam index and one of a hypercell ID or a physical cell ID.

Optionally, in any of the preceding aspects, another implementation of the aspect provides that the group of UEs is associated with a UE group ID, wherein the UE group ID is signaled to the group of UEs in a radio resource control (RRC) message.

Optionally, in any of the preceding aspects, another implementation of the aspect provides that the time-frequency location of the group common control channel for the group of UEs comprises a blind detection area.

Optionally, in any of the preceding aspects, another implementation of the aspect provides that the group-scheduling information includes downlink (DL) assignment and uplink (UL) grant.

Optionally, in any of the preceding aspects, another implementation of the aspect provides that the group-scheduling information includes a Modulation and Coding Scheme (MCS), a redundancy version (RV), precoding information for Multiple-Input, Multiple-Output (MIMO), spreading sequence/codebook set, and resource allocation for DL/UL data transmission.

Optionally, in any of the preceding aspects, another implementation of the aspect provides that time-frequency resources for uplink (UL) reference signal (RS) for channel measurement are indicated in the resource configuration.

Optionally, in any of the preceding aspects, another implementation of the aspect provides that the signaling further includes indicating a UE group ID to the UE.

Optionally, in any of the preceding aspects, another implementation of the aspect provides that the GCCCH information includes time-frequency locations for a plurality of data and/or control channels.

Optionally, in any of the preceding aspects, another implementation of the aspect provides that the GCCCH information includes group-scheduling information, and/or resource configuration for uplink (UL) channel measurement, and/or group power control.

According to one aspect of the present disclosure, there is provided a method in a base station for signaling group common Physical Downlink Control Channel (PDCCH) information. The method includes determining control information common to a group of user equipment (UEs). The control information includes at least one of group scheduling information, resource configuration for uplink (UL) channel measurement, and group power control. The control information is formatted in a Downlink Control Information (DCI) format. The method also includes encoding the control information in a group common PDCCH to generate encoded control information. The method also includes transmitting the encoded control information to the group of UEs.

Optionally, in any of the preceding aspects, the group power control includes power control for an UL data transmission or an UL control channel.

Optionally, in any of the preceding aspects, the method further includes signaling, by the BS, a UE group ID to a group of UEs in a radio resource control (RRC) message, wherein the UE group ID is associated with the group of UEs.

Optionally, in any of the preceding aspects, the method further includes transmitting, by the BS, a second encoded control information to the group of UEs; wherein the encoded control information carrying control information which indicates a time-frequency locations for at least one of a plurality of data channels and a plurality of control channels.

Optionally, in any of the preceding aspects, the control information formatted in a second DCI format.

According to one aspect of the present disclosure, there is provided a base station for signaling group common control channel information. The base station includes a non-transitory memory storage comprising instructions and one or more processors in communication with the memory. The one or more processors execute the instructions for determining control information common to a group of user equipment (UEs). The control information includes at least one of group-scheduling information, resource configuration for uplink (UL) channel measurement, and group power control. The control information is formatted in a Downlink Control Information (DCI) format. The one or more processors also execute the instructions for encoding the control information in a group common control channel to generate encoded control information. The one or more processors also execute the instructions for transmitting the encoded control information to the group of UEs.

Optionally, in any of the preceding aspects, the group power control includes power control for an UL data transmission or an UL control channel.

Optionally, in any of the preceding aspects, the base station further includes instruction for signaling a UE group ID to a group of UEs in a radio resource control (RRC) message, wherein the UE group ID is associated with the group of UEs Optionally, in any of the preceding aspects, the base station further includes instruction for transmitting a second encoded control information to the group of UEs; wherein the encoded control information carrying control information which indicates a time-frequency locations for at least one of a plurality of data channels and a plurality of control channels Optionally, in any of the preceding aspects, the control information formatted in a second DCI format.

According to one aspect of the present disclosure, there is provided a method in a user equipment (UE) for receiving group common Physical Downlink Control Channel (PDCCH) information. The method includes receiving, at the UE, an encoded control information from a base station. The encoded control information is encoded with a control information in a group common PDCCH. The control information includes at least one of group-scheduling information, resource configuration for uplink (UL) channel measurement, and group power control. The control information is formatted in a Downlink Control Information (DCI) format. The method also includes decoding, at the UE, the encoded control information.

Optionally, in any of the preceding aspects, the group power control includes power control for an UL data transmission or an UL control channel.

Optionally, in any of the preceding aspects, the method further includes receiving, by the UE, a UE group ID to the UE in a radio resource control (RRC) message, wherein the UE group ID is associated with the group of UEs.

Optionally, in any of the preceding aspects, the method further includes receiving, by the UE, a second encoded control information from the base station, wherein the encoded control information carrying control information which indicates a time-frequency locations for at least one of a plurality of data channels and a plurality of control channels.

Optionally, in any of the preceding aspects, the control information formatted in a second DCI format.

According to one aspect of the present disclosure, there is provided a user equipment (UE) for receiving group common Physical Downlink Control Channel (PDCCH) information. The UE includes a non-transitory memory storage comprising instructions and one or more processors in communication with the memory. The one or more processors execute the instructions for receiving an encoded control information from a base station. The encoded control information is encoded with a control information in a group common PDCCH. The control information includes at least one of group-scheduling information, resource configuration for uplink (UL) channel measurement, and group power control. The control information is formatted in a Downlink Control Information (DCI) format. The one or more processor also execute the instructions for decoding the encoded control information.

Optionally, in any of the preceding aspects, the group power control includes power control for an UL data transmission or an UL control channel.

Optionally, in any of the preceding aspects, the UE further includes instructions for receiving a UE group ID to the UE in a radio resource control (RRC) message, wherein the UE group ID is associated with the group of UEs.

Optionally, in any of the preceding aspects, the UE further includes instructions for receiving a second encoded control information from the base station; wherein the encoded control information carrying control information which indicates a time-frequency locations for at least one of a plurality of data channels and a plurality of control channels.

Optionally, in any of the preceding aspects, the control information formatted in a second DCI format.

An advantage of a preferred embodiment of the present disclosure is a group common control channel (GCCCH) to support soft AI. Another advantage of one or more embodiments of the present disclosure is a group CCCH that supports group Ack/Nack for use, for example, with UL grant-free transmission.

BRIEF DESCRIPTION OF THE DRAWINGS

For a more complete understanding of the present invention, and the advantages thereof, reference is now made to the following descriptions taken in conjunction with the accompanying drawings, in which:

FIG. 11 is a diagram showing that the BP/numerologies of the UL and DL may be different;

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Fifth Generation (5G) communications systems New Radio (NR) supports a 'group common Physical Downlink Control Channel (PDCCH)' carrying information about the slot structure as well as other information. However, the particular specifications and mechanisms for providing "group common PDCCH" has not been agreed upon. Note, "common" does not necessarily imply common per cell. The term 'group common PDCCH' refers to a channel (either a PDCCH or a separately designed channel) that carries information intended for the group of UEs. 'Slot format related information' includes information from which the UE can derive at least which symbols in a slot that are downlink (DL), uplink (UL), and 'other', respectively. The starting position of downlink data in a slot can be explicitly and dynamically indicated to the UE. If the user equipment (UE) does not receive the 'group common PDCCH' (GC-CCH), the UE should be able to receive at least PDCCH in a slot, at least if the gNB did not transmit the GCCCH. The network will inform the UE through Radio Resource Control (RRC) signaling whether the UE should decode the GCCCH or not.

In LTE, the PDCCH only needed two bits to signal the DL control structure. However, in proposed 5G standards, it is possible that each control channel structure has its own numerology and bandwidth and thus, would require more than two bits to signal the control channel structure to the wireless device.

Disclosed herein are method and systems to utilize GCCCH to support soft Air Interface (AI). Additionally, disclosed herein are methods and systems to provide group Ack/Nack in the GCCCH. In an embodiment, the provisioning of the GCCCH to provide group Ack/Nack is for UL grant-free transmission.

Disclosed herein are systems and methods to provide control information that is common to a group of devices to the group of devices through a GCCCH. In an embodiment, configuration information that is static or semi-static/semi-dynamic (e.g., changes infrequently) is provided via upper layer signaling, such as, for example, via RRC signaling, while dynamic configuration information is signaled via layer 1 signaling. Layer 1 signaling is more expensive than upper layer signaling. Therefore, reserving layer 1 signaling for dynamic configuration information is desirable.

Figure 1:
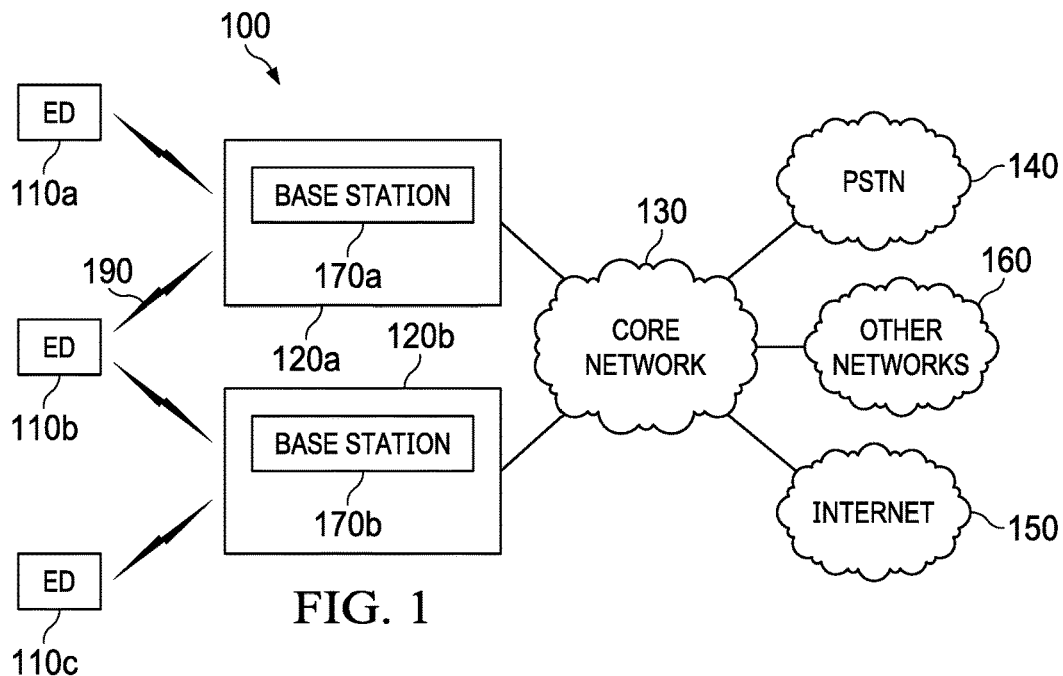
FIG. 1 illustrates an example communication system.

FIG. 1 illustrates an example communication system 100. In general, the system 100 enables multiple wireless or wired users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The EDs 110a-110c are configured to operate and/or communicate in the system 100. For example, the EDs 110a-110c are configured to transmit and/or receive via wireless or wired communication channels. Each ED 110a-110c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the EDs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNB), a Home NodeB, a Home eNodeB, a gNB a site controller, an access point (AP), or a wireless router. The EDs 110a-110c are configured to interface and communicate with the internet 150 and may access the core network 130, the PSTN 140, and/or the other networks 160.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the EDs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 120a-120b are in communication with the core network 130 to provide the EDs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as the PSTN 140, the Internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150.

Although FIG. 1 illustrates one example of a communication system, various changes may be made to FIG. 1. For example, the communication system 100 could include any number of EDs, base stations, networks, or other components in any suitable configuration.

Figure 2A:
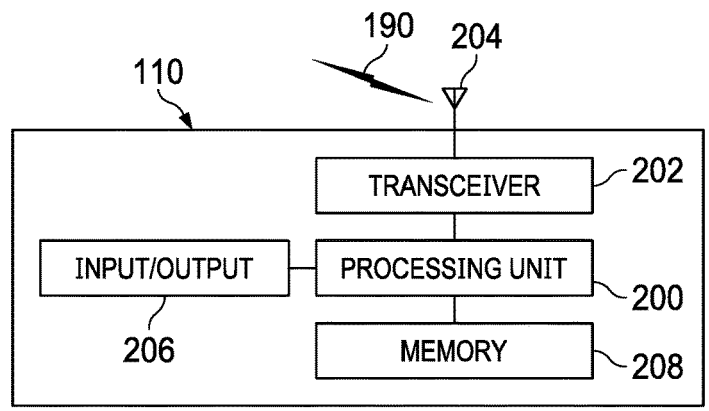
FIGS. 2A and 2B illustrate example devices that may implement the methods and teachings according to this disclosure.
Figure 2B:
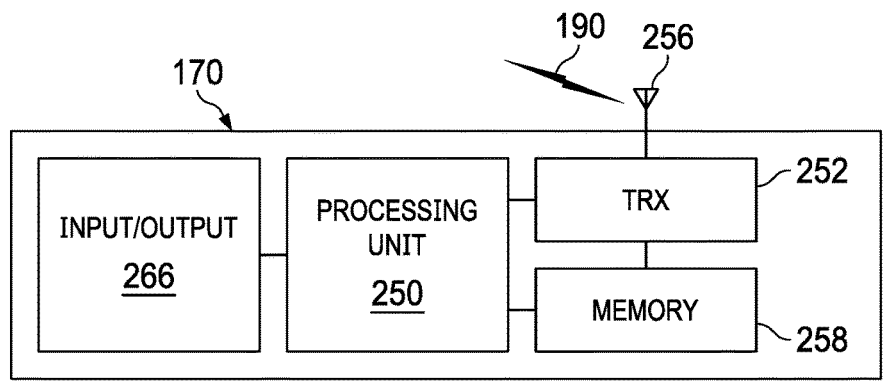

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 also supports the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transceiver 252, which includes functionality for a transmitter and a receiver, one or more antennas 256, at least one memory 258, and one or more input/output devices or interfaces 266. A scheduler 253, which would be understood by one skilled in the art, is coupled to the processing unit 250. The scheduler 253 could be included within or operated separately from the base station 170. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transceiver 252 includes any suitable structure for generating signals for wireless or wired transmission to one or more EDs or other devices. Each transceiver 252 further includes any suitable structure for processing signals received wirelessly or by wire from one or more EDs or other devices. Although shown combined as a transceiver 252, a transmitter and a receiver could be separate components. Each antenna 256 includes any suitable structure for transmitting and/or receiving wireless or wired signals. While a common antenna 256 is shown here as being coupled to the transceiver 252, one or more antennas 256 could be coupled to the transceiver(s) 252, allowing separate antennas 256 to be coupled to the transmitter and the receiver if equipped as separate components. Each memory 258 includes any suitable volatile and/or non-volatile storage and retrieval device(s). Each input/output device 266 facilitates interaction with a user or other devices (network communications) in the network. Each input/output device 266 includes any suitable structure for providing information to or receiving/providing information from a user, including network interface communications.

Following are some terminology definitions. A set of time/frequency resources may be partitioned into different time intervals, such as subframes, transmission time units (TTU), scheduling intervals, slot durations, etc. In all the embodiments, a subframe is the same as transmission time interval (TI). A subframe may have multiple TTUs, or exactly one TTU, depending upon the embodiment. In some embodiments, a TTU may even be longer than a subframe. A scheduling interval typically includes at least one TTU, and a scheduling interval (also referred to as slot) may have a duration in time that is equal to, longer than, or shorter than a subframe. The "DL" refers to one or more downlink OFDM symbols having a particular subcarrier spacing, the "UL" refers to one or more uplink OFDM symbols having the same subcarrier spacing, and the "GP" refers to a guard period between uplink and downlink.

In conventional wireless networks, fixed numerologies have been employed to allow for an ease of design. The parameters of the numerology are typically set based on an understanding of the normal usage parameters of the network. In future networks, a more diverse set of needs must be served. Future networks may operate at a variety of different frequencies and serve a variety of different devices. Satisfying the diverse requirements for future wireless networks, such as fifth generation (5G) wireless networks, may be accomplished according to multiple approaches. In a first approach, which may be considered backward compatible with LTE, sampling frequencies and subcarrier frequencies are selected as integer multiples of the sampling frequencies and subcarrier frequencies already established for LTE. In a second approach, which may be considered to have so-called forward compatibility, the sampling frequencies and subcarrier frequencies are closely related to the sampling frequencies and subcarrier frequencies set for LTE, but are non-integer multiples. For the first approach, the backward compatible to LTE solution, there are two versions of the solutions based on how many symbols and cyclic prefix (CP) lengths in a sub-frame or transmission time interval. First version solutions are strictly compatible with LTE and involve using seven symbols or "7(1,6)" symbols in a sub-frame. The notation 7(1,6) represents a scheme with a first CP length for one symbol among the seven symbols and a second CP length for the other six symbols. For strict compatibility with LTE, the two CP lengths and the CP overhead in the base subcarrier spacing of 15 kHz are arranged to be the same as the two CP lengths and the CP overhead of current LTE. The second version solutions may be seen as closely compatible to LTE in the sense that their CP overhead and seven symbols in a sub-frame are the same as the CP overhead and the number of symbols used for current LTE, however, the symbols with different CP lengths are distributed in a manner distinct from LTE, e.g., 7(3,4) and 7(2,5).

In LTE, the parameter transmission time interval (TI) is used to refer to the transmission time for a defined set of OFDM symbols. In some examples, TTI can also be referred to as a "transmission time unit (TTU)" or "sub-frame duration", which indicates the physical (PHY) layer symbol and frame time structure. Similar to TTI, TTU and "sub-frame duration" are each equal to the sum of the useful symbol duration and any symbol overhead such as cyclic prefix CP time for all of the OFDM symbols include in a set. For the second approach, with so-called forward compatibility, a flexible number of symbol configurations may be considered per transmission time interval (TI). For any base subcarrier spacing (SCS), any number of symbols per TTI can be configured. This may be referred to as a discretionary N (dN) solution, based on the diverse requirements of applications, such as latency, control/data, TDD/FDD configurations, and co-existence, etc. As will be addressed hereinafter, the term "co-existence" relates to two or more sub-bands in use for a given connection employing compatible numerologies.

In example embodiments, for backward and forward compatibility solutions, the design methodology and criteria are as follows: for any base subcarrier spacing (15 kHz, 16.875 kHz, 17.5 kHz, 22.5 kHz, 16.5 kHz, etc.), the integer scalable subcarrier spacing (SCS) values have an inversely scalable relationship over the CPs for a given CP overhead. Moreover, the integer scalable SCS values have an inversely scalable relationship over both CPs and TTIs for a given number of symbols and given CP overhead. Larger TTIs can be concatenated by smaller TIs, where a minimum TTI (or basic TTI unit) consists of the minimum number of symbols that is valid for implementation configurable in the TTI in such base subcarrier spacing. For one example, a scheme using 15 kHz subcarrier spacing is valid with seven symbols per TTI to make the scheme backward compatible to LTE. For another example, a scheme using 16.875 kHz subcarrier spacing is valid with one symbol per TTI for the implementation. The parameter (e.g., SCS, TTI, CP) configurations are based on the diverse requirements of applications, such as latency, control/data, TDD/FDD configurations, and co-existence, etc.

In example embodiments, a communications network is provided that employs an OFDM transmission system in which the OFDM transmission parameters, such as subcarrier spacing parameter, can be configured to accommodate for different requests that may be placed on the network. Such requests may be related to factors such as speed of user equipment (UE), use of high frequency bands, or use of low cost, narrowly spaced frequency bandwidth communications devices. In this regard, OFDM numerology schemes are described herein that can be applied to radio frame structures for both FDD and TDD modes in a wireless network. Conveniently, the OFDM numerology schemes permit one or more of: multiple subcarrier spacing options; multiple transmission time interval (TTI) options; multiple cyclic prefix (CP) options; multiple carrier bandwidth options; and multiple fast Fourier Transform (FFT) sizes. Accordingly, the OFDM numerology schemes may be flexible enough to satisfy different requirements that may arise in the wireless network.

Figure 3:
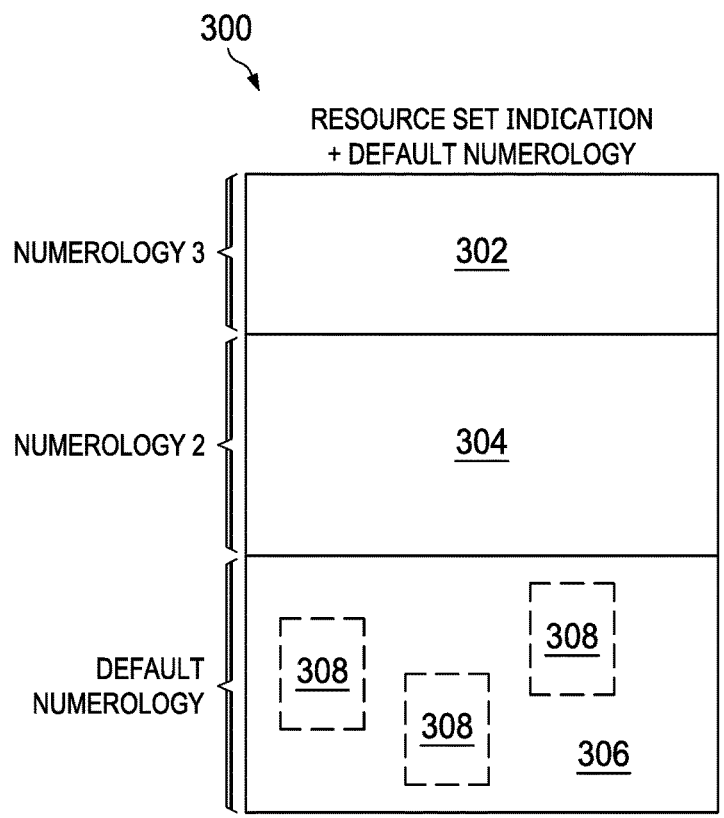
FIG. 3 is a diagram illustrating an embodiment of possible locations of the GCCCH using a default numerology.

Example embodiments are described herein in which the parameters of a Filtered OFDM (F-OFDM) or Time windowing OFDM (W-OFDM) system may, in at least some applications, be configurable to support multiple waveforms, multiple access schemes and multiple frame structures, thereby accommodating a range of application scenarios and service requirements. By way of example, FIG. 3 illustrates an F-OFDM time-frequency signal plot 300 illustrating the application of three sub-band filters to create OFDM subcarrier groupings with three different inter-subcarrier spacings, OFDM symbol durations and guard periods. By enabling multiple parameter configurations, F-OFDM can, in at least some applications, allow for the optimal selection of parameters for each service group and, thus, may facilitate overall system efficiency.

In example embodiments, the OFDM numerology with scalable features are designed with TTIs that are linearly and inversely scaled with subcarrier spacing options to maintain a limited set of sampling frequencies for different FFT sizes. In some applications, such a configuration may reduce the complexity of the network interface used in communications equipment—for example, chipset implementation complexity in receiving devices may be reduced. In some example embodiments, optimized CP and TTI schemes are provided to achieve one-for-all applications for each subcarrier spacing option.

Turning now to the details of the GCCCH, the GCCCH structure and systems and methods or signaling group control information to the EDs using the GCCCH are described below. In an embodiment, the GCCCH is similar to a PDCCH and carries a Downlink Control Information (DCI) like message that may include resource assignments for a group of UEs. The GCCCH provides an indication of data/control time-frequency structure for a group of UEs.

In one embodiment, a base station signals time-frequency (TF) location of the GCCCH via RRC signaling using the UE group ID and using a default numerology. In another embodiment, a base station signals time-frequency (TF) location of the GCCCH via SIB signaling using a system ID and using a default numerology. In another embodiment, the indication of the TF location of GCCCH includes a resource set indication and default numerology. The resource set indication may also be referred to as a set of resource blocks. In another embodiment, the indication of the TF location of GCCCH includes a resource set indication and configurable numerology. The content of the GCCCH may include a bandwidth partition (BP) and a numerology structure of the UL or DL channel. The content may also include the BP and numerology structure for a side link (SL) channel. The content may also indicate the UL partitioning for grant free and grant based partitioning. In an embodiment, there is a separately independent configured BP/numerology structure for the DL and for the UL—thus, the BP/numerology structure of the DL of the UL may be the same or different. In other words, the DL and UL parts of the slot can use different or the same BP/numerology structure. In an embodiment, the BP/numerology structure is partially signaled in GCCCH and partially in a System Information Block (SIB) (semi-dynamic). In an embodiment, the BP/numerology structure is completely signaled in the GCCCH (fully dynamic). The numerology may include subcarrier spacing, CP length, and TTI length as well as other details on the frame structure. The content of the GCCCH may also include the control channel structure for the regular control channel. The size of the UE-group may be relatively large. The GCCCH supports mixed services in the same channel. Different services may have different requirements, and so, may require different BP, numerologies, control channel structures, etc. The GCCCH supports soft AI by enabling dynamic or semi-dynamic configuration of BP/numerologies and control channel structure.

FIG. 3 is a diagram of a plot 300 illustrating an embodiment of possible locations of the GCCCH 308 using a default numerology 306. A default numerology 306 (also referred to below as frame structure) is a predefined numerology that the UEs and base stations know in advance and does not require signaling to communicate the numerology to the UEs. Here the default numerology (frame structure) has a different AI configuration with numerology 2 304 and numerology 3 302.

Figure 4:
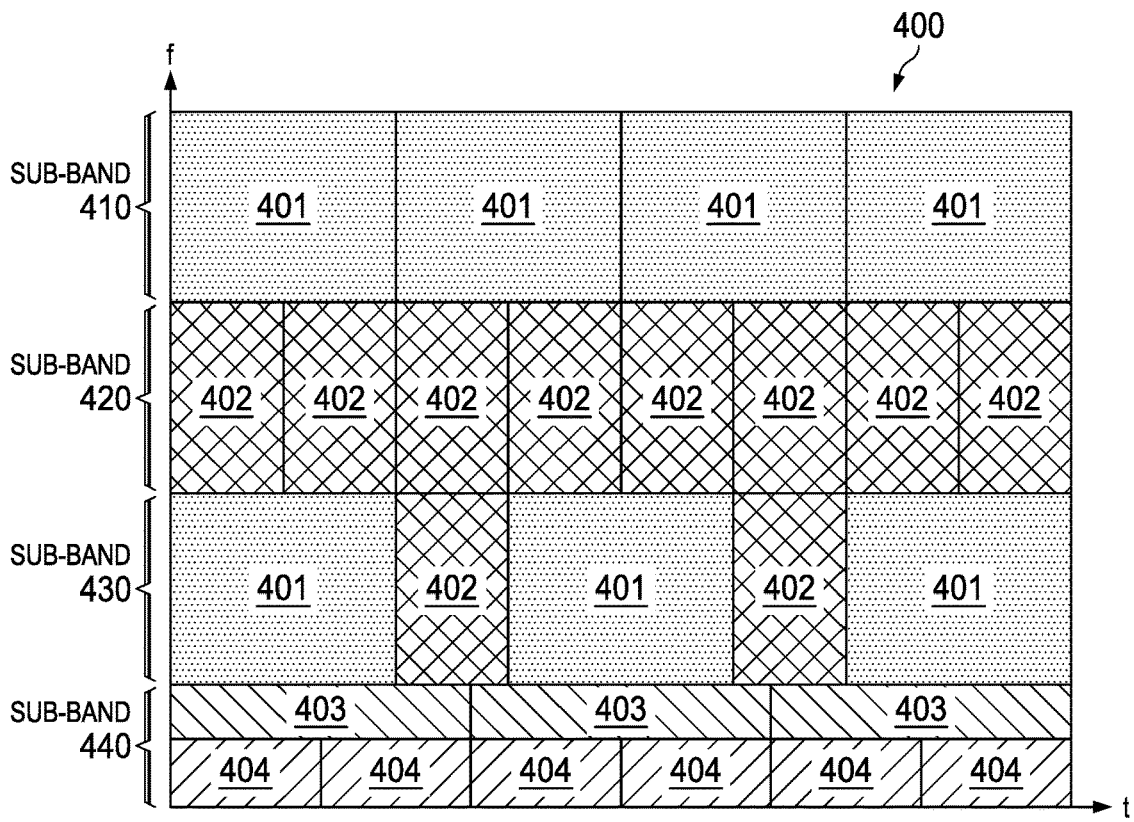
FIG. 4 illustrates a diagram of an embodiment filtered-orthogonal frequency division multiplexing (f-OFDM) configuration.

The possible locations of the GCCCH 308 include at least one of the following:

One or more symbols from the beginning of a slot or subframe together with the entire bandwidth part of the corresponding numerology;

One or more symbols from the beginning of a slot together with a portion of the bandwidth part of the corresponding numerology;

One or more symbols from the end of a slot or subframe together with the entire bandwidth part of the corresponding numerology;

One or more symbols from the end of a slot together with a portion of the bandwidth part of the corresponding numerology;

One or more symbols from the middle of a slot or subframe together with the entire bandwidth part of the corresponding numerology;

One or more symbols from the middle of a slot together with a portion of the bandwidth part of the corresponding numerology;

The entire slot together with a portion of the bandwidth part of the corresponding numerology;

FIG. 4 illustrates a diagram of an embodiment filtered-orthogonal frequency division multiplexing (f-OFDM) configuration 400, it could be other waveform options, for example just like time windowing orthogonal frequency division multiplexing (not shown in the Fig). As shown, the f-OFDM configuration 400 comprises frequency sub-bands 410, 420, 430, 440 over which different frame formats 401-404 are transmitted. Each of the different frame formats 401-404 has a different combination of frame parameters, e.g., CP-lengths, SCS, symbol duration, transmission time interval (TTI) length, etc. In some embodiments, different frame formats are assigned to different frequency sub-bands. In this example, the sub-band 410 is assigned the frame format 401, while the sub-band 420 is assigned the frame format 402. In other embodiments, different frame formats are assigned to be communicated at different time periods in the same frequency sub-band. In this example, the frame formats 401, 402 are assigned in a time division multiplexed (TDM) fashion. While an alternating pattern of two frame formats (i.e., the frame formats 401, 402) are depicted as being communicated over the sub-band 430, it should be appreciated that any pattern of frame formats, and any number of different frame formats, can be assigned to a frequency sub-band. In other embodiments, different frame formats may be communicated over different sub-carriers of the same frequency sub-band. In this example, the frame formats 403, 404 are communicated over different sub-carriers of the frequency sub-band 440. The bandwidths of the frequency sub-bands 410, 420, 430 and 440 can be changed over time. Other examples are also possible.

Figure 5:
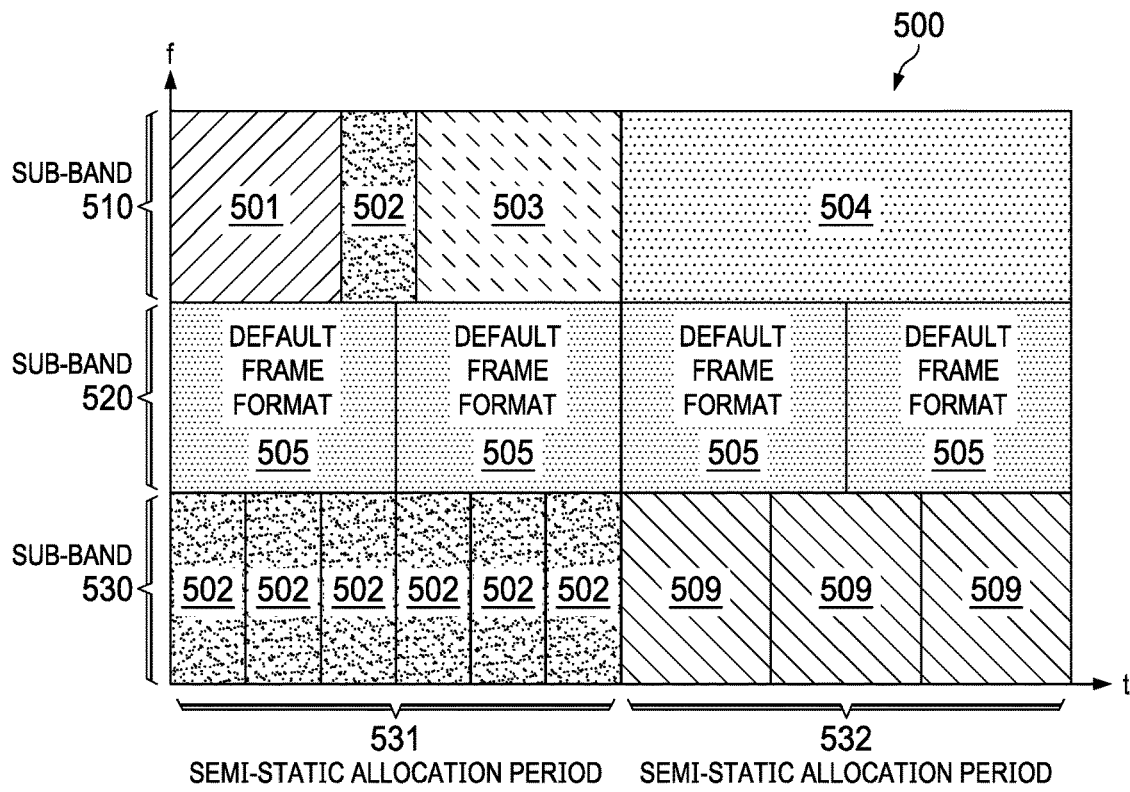
FIG. 5 illustrates a diagram of another embodiment f-OFDM configuration.

In some embodiments, frame formats can be assigned to f-OFDM signals communicated over one or more frequency sub-bands. FIG. 5 illustrates a diagram of another embodiment f-OFDM configuration 500. As shown, the f-OFDM configuration 500 comprises frequency sub-bands 510, 520, 530 over which different frame formats 501-509 are communicated. Each of the different frame formats 501-509 has a different combination of frame parameters, e.g., CP-lengths, SC spacings, symbol durations, TTI lengths, etc. In this example, the frequency sub-band 520 is assigned a default frame format 505. The frame format 505 may have a standard set of frame parameters (e.g., CP-length, SC-spacing, symbol duration, etc.) that is known by mobile devices. The default frame format 505 can be transmitted continuously in time or it can be transmitted periodically (e.g. "Config 1" in FIG. 6). This may allow mobile devices entering the wireless network to receive signals in the frequency sub-band 520. The frequency sub-band 520 may be used to assign frame formats to the frequency sub-band 510, as well as to assign frame formats to the frequency sub-band 5300. Notably, dynamically assigning frame formats to the frequency sub-band 510 may allow a different frame format to be assigned to each f-OFDM signal on a frame-by-frame basis. In this example, the frame format 501 is assigned to a first f-OFDM signal communicated over the frequency sub-band 510, the frame format 502 is assigned to a second f-OFDM signal communicated over the frequency sub-band 510, the frame format 503 is assigned to a third f-OFDM signal communicated over the frequency sub-band 510, and the frame format 504 is assigned to a forth f-OFDM signal communicated over the frequency sub-band 510. The bandwidths of frequency sub-bands 510, 520 and 530 can be changed over time.

Semi-static configuration of frame formats in the frequency sub-band 530 may allow different frame formats to be assigned to different semi-static allocation periods 531, 532. Semi-static configuration of frame formats may generate less overhead than dynamic configuration of frame formats. In this example, the frame format 502 is assigned to the semi-static allocation period 531, and the frame format 509 is assigned to the semi-static allocation period 532.

Figure 6:
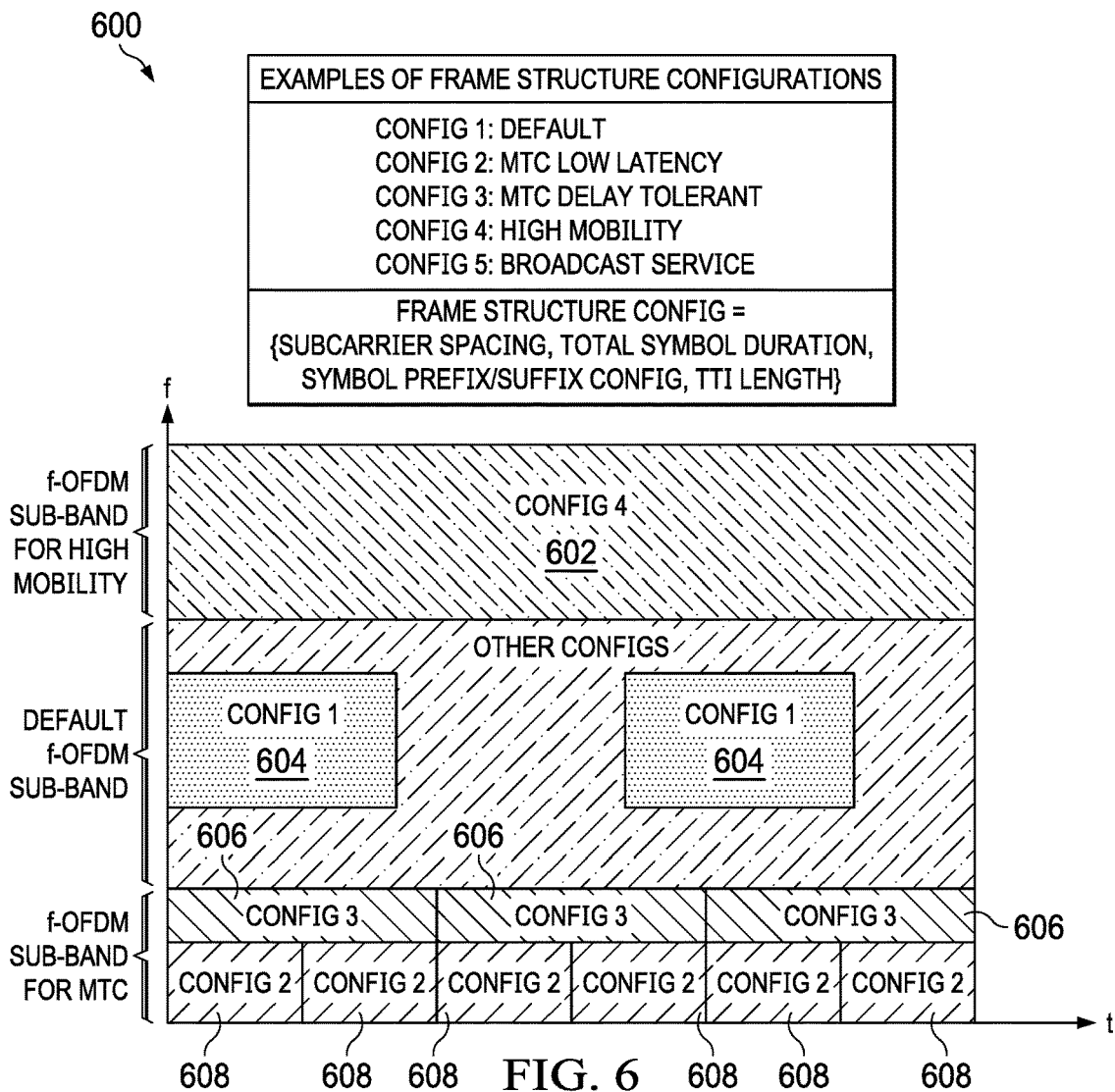
FIG. 6 illustrates examples of frame structure configurations, which include subcarrier spacing, total symbol duration, symbol prefix/suffix configuration, and TTI length.

FIG. 6 illustrates examples of frame structure configurations 600, which include subcarrier spacing, total symbol duration, symbol prefix/suffix configuration, and TTI length. As illustrated in FIG. 6, Configuration 1 604 is a default configuration. Configuration 2 608 is a configuration for low latency machine-type communication (MTC), and configuration 3 606 is a configuration for delay tolerant MTC. Configuration 4 602 is for high mobility, and configuration 5 is for broadcast service. This is applicable for both downlink and uplink.

In the intra-f-OFDM sub-band, the frame structure configurations with the same subcarrier spacing and total symbol duration can coexist. The inter-f-OFDM sub-band includes configurations with different subcarrier spacing and total symbol duration. The default frame structure occurs in predefined time-frequency resources within a default f-OFDM sub-band. This occurs at predefined periods, not necessarily all of the time. It facilitates initial access by mobile device, and may be mandatory for downlink (DL), but optional for uplink (UL). The default frame structure can be a backward compatible frame structure configuration (e.g., long-term evolution (LTE)) or a 5G default frame structure configuration. This depends on, for example, carrier frequencies.

A mechanism for adaptive frame structure with f-OFDM according to embodiments is described as follows. First, a default frame structure parameter set (configuration) is defined (e.g., default subcarrier spacing, total symbol duration, TTI length, symbol overhead such as prefix/suffix length, etc.). Next, additional frame structure parameters sets (configurations) different from the default frame structure parameter set are defined. In an embodiment, the different f-OFDM sub-band frame structure has at least a different SC spacing and total symbol duration.

Figure 7:
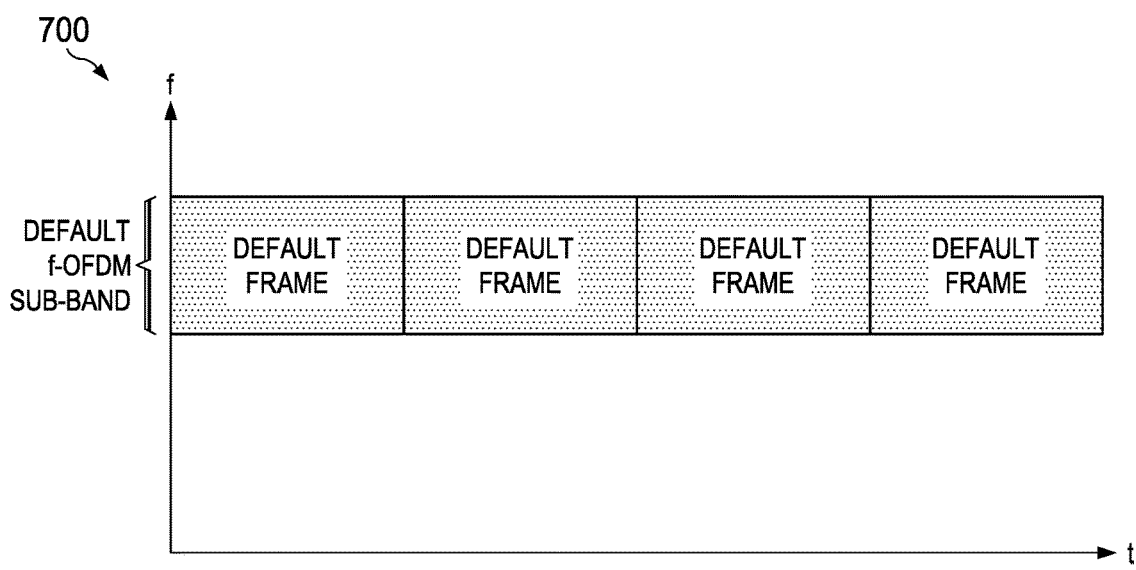
FIG. 7 illustrates a default f-OFDM sub-band according to an embodiment.

Next, the default frame structure is transmitted in predefined time-frequency resources within a default f-OFDM sub-band. This is known at both the network and the mobile device (e.g., located in the bandwidth (BW) around the carrier frequency for DL). The default f-OFDM sub-band is at least the BW of the time-frequency resources occupied by the default frame structure. The default frame structure can be used for carrying any type of traffic. FIG. 7 illustrates a default f-OFDM sub-band 700 according to an embodiment. Finally, additional frame structures in other f-OFDM sub-bands are configured on demand.

Default frame structure parameter set embodiments include a default 5G frame structure parameter set that is different from that of LTE. An LTE frame structure parameter set may include, e.g., SC (sub-carrier spacing)=15 kHz, TTI=1 ms, etc. Additional frame structure parameter set embodiments including frame structures for high speed and low speed, frame structures for a dispersive channel (e.g., outdoor) and a less dispersive channel (e.g., indoor), frame structures for different carrier frequencies, and frame structures for different traffic characteristics (e.g., latency). Table 1 lists the types of parameters that are well suited for different traffic/receivers. Table 2 lists example frame format parameters for a 7.5 kilohertz (KHz) sub-carrier spacing. Table 3 lists example frame format parameters for a 15 kilohertz (KHz) sub-carrier spacing. Table 4 lists example frame format parameters for a 30 kilohertz (KHz) sub-carrier spacing. Table 5 lists example frame format parameters for a 30 kilohertz (KHz) sub-carrier spacing. Table 6 illustrates example f-OFDM frame parameters selected from Table 1 to 5 for various configurations. The parameters may support smooth scalability of LTE in terms of subcarrier spacing (e.g., 7.5, 15, 30, 60 kHz). Embodiments include backward compatibility with the LTE basic time unit (or sampling frequency of 30.72 MHz). Various embodiments provide for narrow subcarrier spacing of 7.5 KHz along considering for device-to-device (D2D) or MTC. Various embodiments also support three types of CP for different environments, e.g., outdoor and indoor, large and small cells, e.g., mini CP (1~2 us), normal CP (~5 us) and extended CP (>5 us). Embodiments provide for reduced and varying CP overhead options, e.g., 1%~100%, and short and long TTIs, e.g., able to form different frame sizes of, e.g., 0.15 ms, 1 ms, 5 ms, etc.

TABLE 1

| CONFIGURATION | SC-SPACING | SYMBOL DUR. | CP-PREFIX | TTI |
|---|---|---|---|---|
| MTC Low Latency | small | long | long | short |
| MTC Delay Tolerant | small | long | long | medium |
| High Mobility | large | short | medium | medium |
| Broadcast Services | medium | medium | long | medium |

TABLE 2

| Subcarrier spacing (KHz) | 7.5 | 7.5 | 7.5 | 7.5 |
|---|---|---|---|---|
| Useful duration T_u (us) | 133.333 | 133.333 | 133.333 | 133.333 |
| CP length (us) | 16.667 | 9.54/9.44 | 5.57/5.18 | 1.82/1.76 |
| CP length in Ts (=32.55 ns) | 512 | 293/290 | 171/159 | 56/54 |
| # of symbols per TTI | 1 | 6/1 | 35/ 1 | 25/12 |
| TTI (ms) | 0.150 | 1 | 5 | 5 |
| CP overhead | 11.11% | 6.67% | 4.00% | 1.33% |

TABLE 3

| Subcarrier spacing (KHz) | 15 | 15 | 15 |
|---|---|---|---|
| Useful duration T_u (us) | 66.667 | 66.667 | 66.667 |
| CP length (us) | 8.333 | 5.2/4.7 | 2.31/2.28 |
| CP length in Ts (=32.55 ns) | 256 | 160/144 | 71/70 |
| # of symbols per TTI | 2 | 1/6 | 18/11 |
| TTI (ms) | 0.150 | 0.5 | 2 |
| CP overhead | 11.11% | 6.67% | 3.33% |

TABLE 4

| Subcarrier spacing (KHz) | 30 | 30 | 30 | 30 |
|---|---|---|---|---|
| Useful duration T_u (us) | 33.333 | 33.333 | 33.333 | 33.333 |
| CP length (us) | 4.167 | 2.4/2.38 | 3.71/3.65 | 1.17/1.14 |
| CP length in Ts (=32.55 ns) | 128 | 74/73 | 114/112 | 36/35 |
| # of symbols per TTI | 4 | 1/6 | 8/1 | 9/20 |
| TTI (ms) | 0.150 | 0.250 | 0.333 | 1 |
| CP overhead | 11.11% | 6.67% | 10.00% | 3.33% |

TABLE 5

| Subcarrier spacing (KHz) | 60 | 60 | 60 | 60 |
|---|---|---|---|---|
| Useful duration T_u (us) | 16.667 | 16.667 | 16.667 | 16.667 |
| CP length (us) | 1.2/1.17 | 2.083 | 1.53/1.37 | 0.88/0.85 |
| CP length in Ts (=32.55 ns) | 37/36 | 64 | 47/42 | 27/26 |
| # of symbols per TTI | 4/3 | 8 | 10/1 | 18/1 |
| TTI (ms) | 0.125 | 0.150 | 0.200 | 0.333 |
| CP overhead | 6.67% | 11.11% | 8.33% | 5.00% |

TABLE 6

| CONFIGURATION | SC-SPACING | SYMBOL DUR. (MS) | CP-PREFIX (MS) | TTI (MS) |
|---|---|---|---|---|
| MTC Low Latency | 7.5 | 133.333 | 16.667 | 0.15 |
| MTC Delay Tolerant | 7.5 | 133.333 | 16.667 | 1.5 |
| High Mobility | 30 | 33.333 | 3.71/3.65 | 0.333 |
| LTE Comp. | 15 | 66.7 | 5.2/4.69 | 1 |

Figure 8:
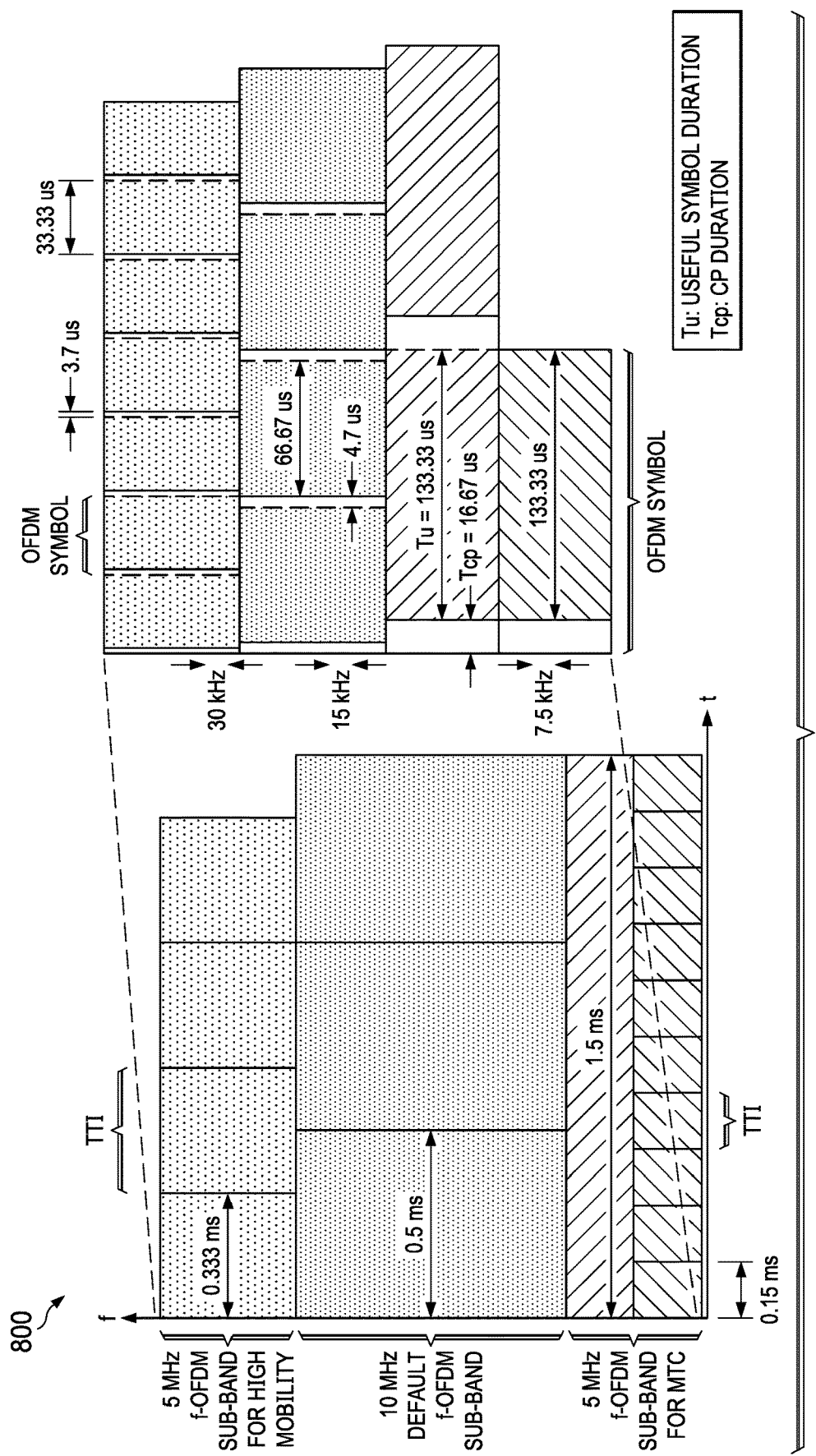
FIG. 8 is a diagram illustrating an embodiment f-OFDM configuration for supporting adaptive frame formats.

FIG. 8 is a diagram illustrating an embodiment f-OFDM configuration 800 for supporting adaptive frame formats. In this embodiment, the 4 frame formats listed in Table 6 are communicated in 3 f-OFDM subbands of a 20 MHz spectrum. With the use of f-OFDM, the OFDM total symbol durations (cyclic prefix+useful symbol duration) corresponding to different frame structure configurations do not need to be aligned as shown in the figure. That is, non-orthogonal sets of parameters can co-exist. For example, the 300 kHz ("High mobility") configuration has an OFDM total symbol duration of around 37☐s whereas the 15 kHz ("LTE compatible") configuration has an OFDM total symbol duration of around 71☐s.

Additional details regarding frame structures may be found in U.S. patent application Ser. No. 15/004,430 filed Jan. 22, 2016 which is incorporated herein as if reproduced in its entirety.

Figure 9:
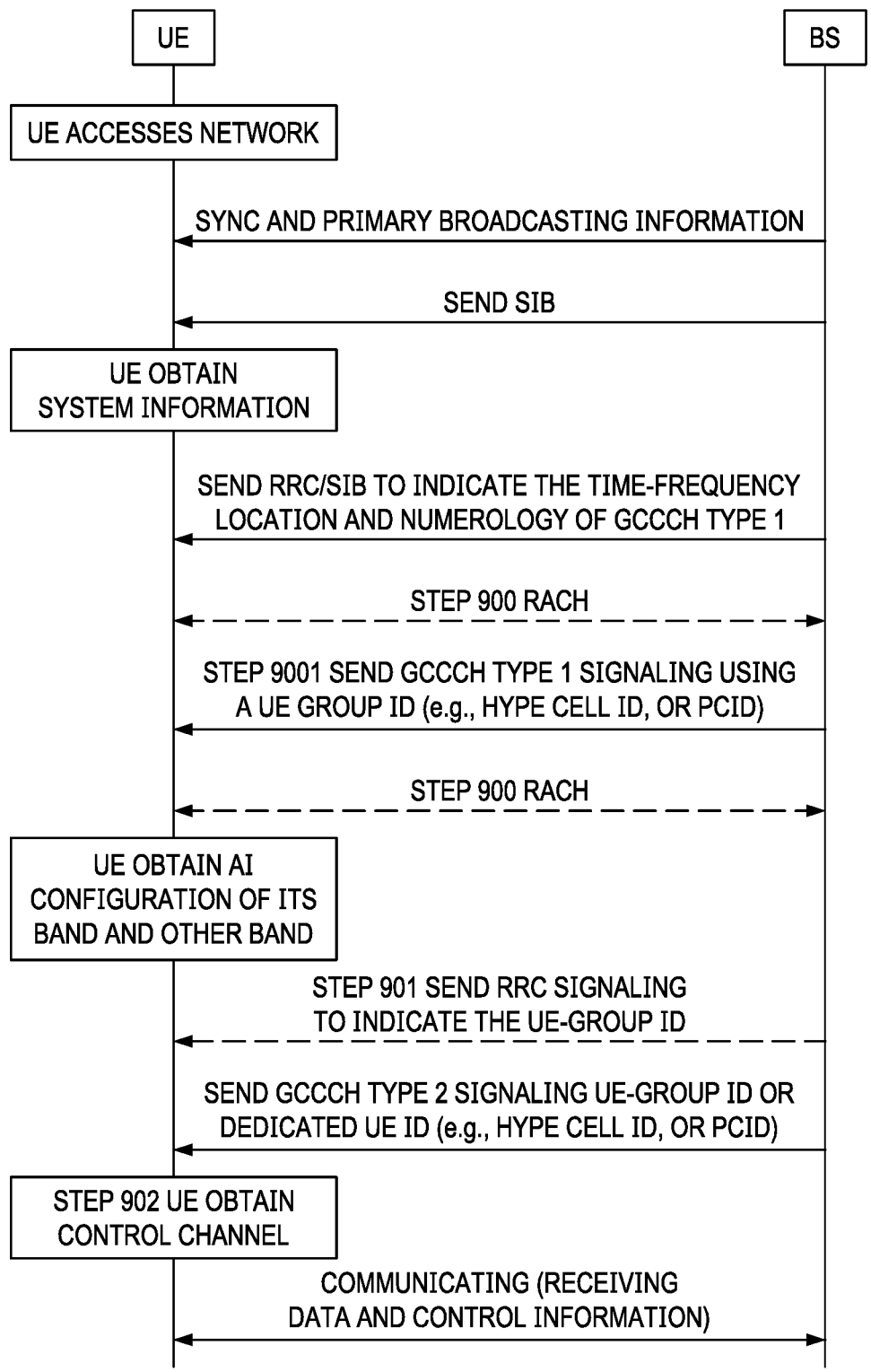
FIG. 9 is a diagram illustrating an embodiment of a method for group configuration.

FIG. 9 is a diagram illustrating an embodiment of a method for group configuration. Taking FIG. 9 as an example, some examples support two types of GCCCH design. Type 1 of GCCCH is used to support different AI configuration with different numerology (shown in FIG. 4 to 8), type 2 of GCCCH is used to support group ACK/NACK for uplink grant free or grant-based transmission. When a UE accesses the network initially, the UE gets downlink synchronized with the network. For example, the UE receives a primary broadcasting information from BS, and the UE obtains sync information, for an example, symbol and time slot sync information. Then UE monitors a SIB to obtain a system information, for an example the SIB indicates at least one of the following: mixed numerology, sub-band/whole band based adaptive TTI, or the time/frequency domain information assigned to a slice/service, RACH configuration.

The UE receives a RRC signaling or SIB from the BS, and the RRC signaling or SIB is used to indicate the time-frequency location and numerology of GCCCH type 1, the numerology can be default numerology or configurable numerology. Here for the case of the default numerology, the BS does not need to indicate the numerology parameters, and for the case of the configurable numerology, the BS needs to indicate the numerology parameters.

In some embodiment, the SIB signalling can be one or more SIBx format signalling similar to LTE.

In this embodiment, one option is to perform the step 900: a RACH procedure. The RACH procedure can be 2-step RACH or 4-step RACH or any other type of RACH procedure. The RACH is to at least perform UL synchronization and RRC signal a UE dedicated ID and/or a UE Group ID. In another option, the step 900 can be performed after step 9001, in which case, the RACH is to at least perform UL synchronization and RRC signal a UE dedicated ID.

Step 9001: The UE receives a GCCCH type 1 signaling using a UE group ID, e.g. hyper cell ID, or PCID or a UE group ID which is signaled during or after RACH, and the UE obtains at least two parts:

One part: AI configuration of its band and other band. For an example, the UE obtain Bandwidth part (BP)/numerology structure. Separately independent configured BP/numerology structure for DL and UL (i.e., they could be the same or different). In other words, DL and UL parts of the slot can use different or the same BP/num structure. BP/num structure can be partially signaled in Type 1 GCCCH and partially in SIB (semi-dynamic), or it can be totally signally in Type 1 GCCCH (fully dynamic)

The second part: The structure of regular control channel (including its numerology) is signaled to the group of UEs. The numerology of the regular control channel can be different with the default numerology. Also, the same structure/numerology of the regular control channel can be assigned to all the UEs in the group of UEs, or different structures/numerologies for the regular control channel can be assigned to different UEs or subgroups of UEs in the group of UEs.

Figure 10:
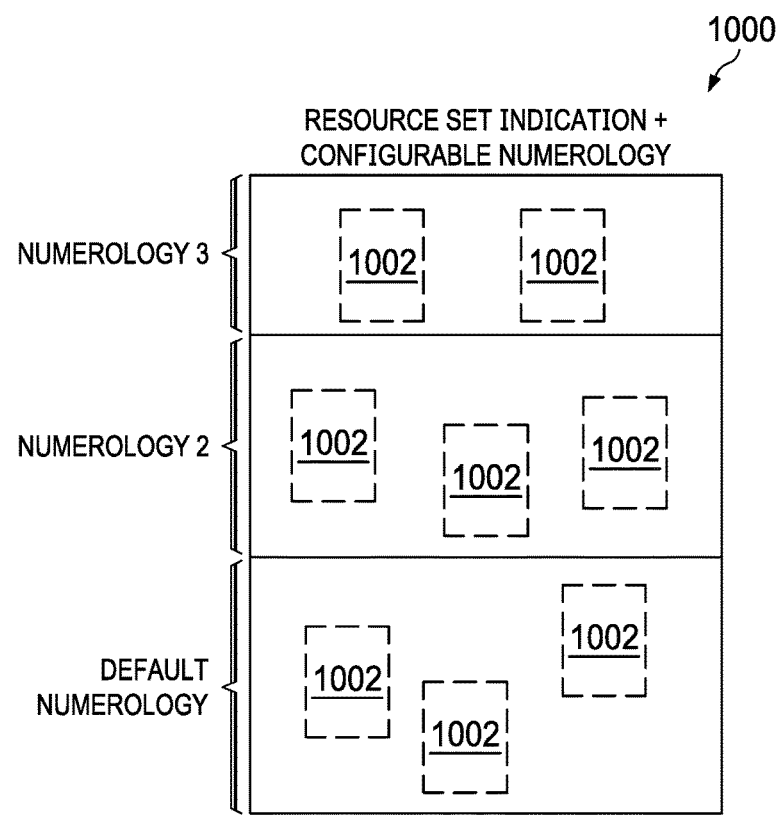
FIG. 10 is a diagram illustrating an embodiment of possible locations of the GCCCH using a configurable numerology.

The UE receives GCCCH type 2 signaling using UE-group ID or Dedicated UE ID, here the UE-group ID can be the same or different with the above UE-group ID in GCCCH type 1. In one option, if the UE-group ID is different with the above UE-group ID in GCCCH type 1, the UE needs to receive an RRC signaling to indicate the UE-group ID before receiving the GCCCH type 2 (the Step 901). The step 902, the UE obtains the control related information including at least one of the following:

A new special DCI format with the following Content:
Group-scheduling information: DL assignment/UL grant
MCS, RV, precoding information for MIMO, Spreading sequence/codebook set, Resource allocation for DL/UL data transmission
Both UE-specific and group-common scheduling are supported
Resource configuration for DL channel measurement
For UL channel measurement, some common configuration can be signaled here, e.g. the time-frequency resources for UL RS for channel Measurement. The actual RS sequences and the antenna port can be signaled through other individual UE-specific signaling
Group-power control
PC for the UE-group UL data transmission
PC for the UE-group UL control channel
Both UE-specific and group-common PC are supported
Group-Ack/Nack for UL transmission by the UE-group
Implicit or explicit association of UEs and Ack/Nacks FIG. 10 is a diagram 1000 illustrating an embodiment of possible locations of the GCCCH 1002 using a configurable numerology. The possible locations of the GCCCH 1002 include One or more symbols from the beginning of a slot or subframe together with the entire bandwidth part of the corresponding numerology;

One or more symbols from the beginning of a slot together with a portion of the bandwidth part of the corresponding numerology;

One or more symbols from the end of a slot or subframe together with the entire bandwidth part of the corresponding numerology;

One or more symbols from the end of a slot together with a portion of the bandwidth part of the corresponding numerology;

One or more symbols from the middle of a slot or subframe together with the entire bandwidth part of the corresponding numerology;

One or more symbols from the middle of a slot together with a portion of the bandwidth part of the corresponding numerology;

The entire slot together with a portion of the bandwidth part of the corresponding numerology;

A configurable numerology is a numerology that is semi-statically or dynamically changeable and is configured to match various requirements, preferences, etc. for the particular services and UEs currently being served.

FIG. 11 is a diagram 1100 showing that the BP/numerologies 1102, 1104 of the UL and DL may be different.

Figure 12:
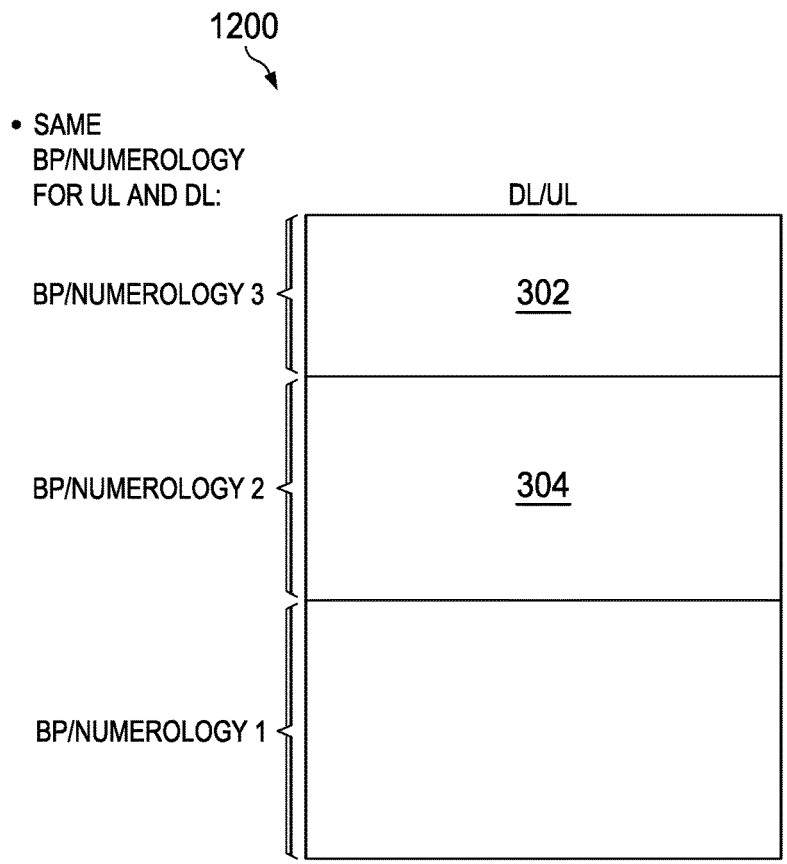
FIG. 12 is a diagram showing that the BP/numerology for the UL and DL may be the same.

FIG. 12 is a diagram showing that the BP/numerology 1200 for the UL and DL may be the same.

In an embodiment, the UE group is equivalent to all UEs within a beam. In an embodiment, the UE group ID is a function of the hypercell ID or the physical cell ID (PCID) and beam index.

In an embodiment, the UE group ID is RRC signaled to the UEs.

In another embodiment, the time-frequency location of GCCCH is a blind detection area which is observed by all the UEs belonging to the UE-group. The time-frequency location could be linked to the UE-group ID or to a dedicated UE ID. The GCCCH provides group Ack/Nack together with data scheduling of a group of UEs.

In an embodiment, the GCCCH includes a DCI like format with the following content: group-scheduling information, resource configuration for DL/UL channel measurement, group power control, and group Ack/Nack for UL transmission by the UE-group. In an embodiment, the size of the UE group is relatively small. In an embodiment, the GCCCH is transmitted in the physical layer (i.e., layer 1).

The group-scheduling information includes DL assignment/UL grant. The group scheduling information may include a Modulation and Coding Scheme (MCS), an RV, precoding information for Multiple-Input, Multiple-Output (MIMO), spreading sequence/codebook set, and resource allocation for DL/UL data transmission. Both UE-specific and group-common scheduling are supported.

For UL channel measurement, some common configuration can be signaled in the resource configuration for UL measurement. For example, the time-frequency resources for UL reference signal (RS) for channel measurement can be signaled in the resource configuration. The actual RS sequences and the antenna port can be signaled through other individual UE-specific signaling.

The group power control (PC) includes PC for the UE-group UL data transmission and the PC for the UE-group UL control channel. Both UE-specific and group-common PC are supported.

The group Ack/Nack for UL transmission by the UE-group includes implicit or explicit association of UEs and Ack/Nacks.

Figure 13:
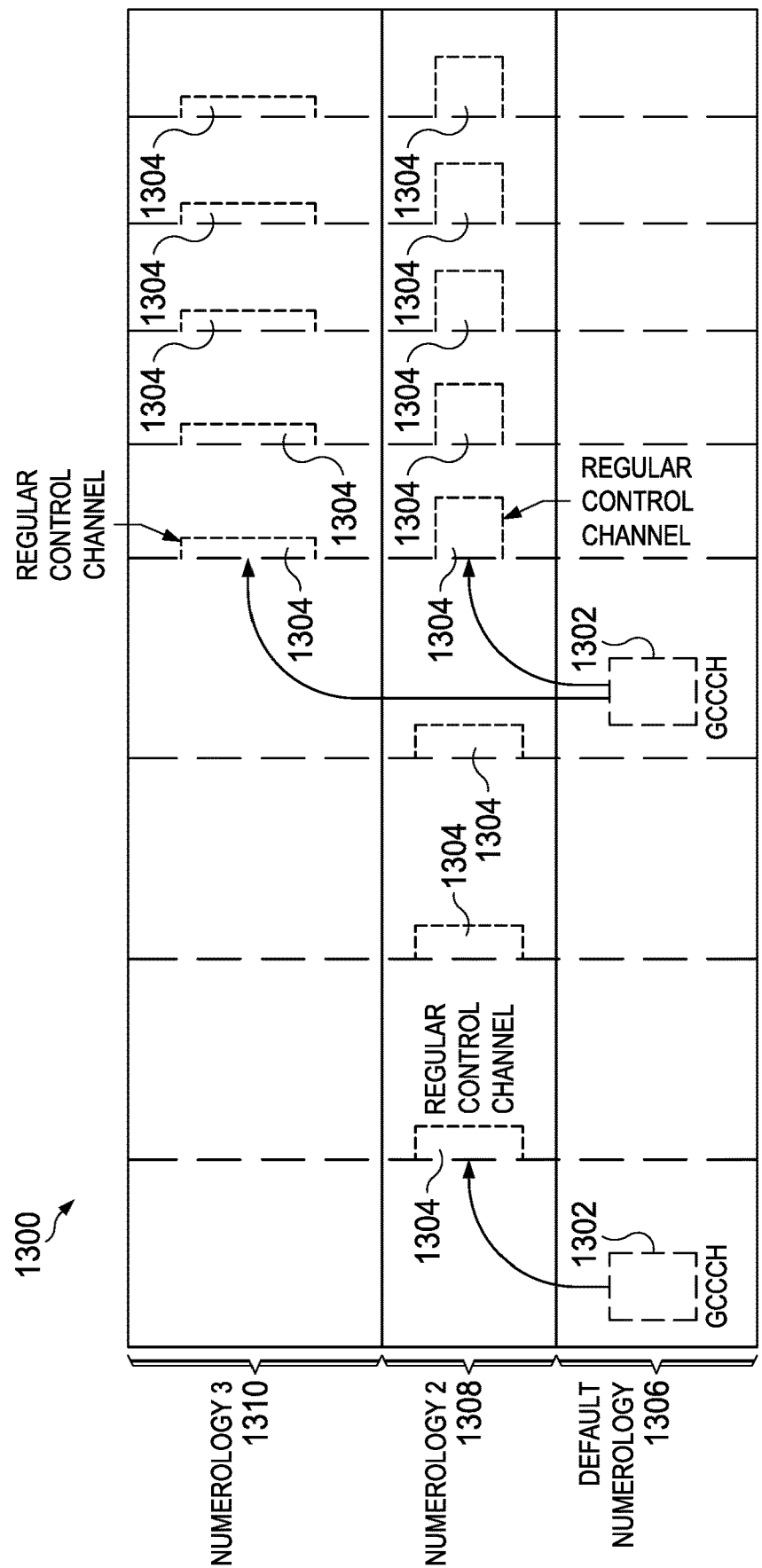
FIG. 13 is a diagram illustrating an embodiment configuration of a regular control channels using group common control channel.

FIG. 13 is a diagram 1300 illustrating an embodiment configuration of regular control channels using group common control channel 1302. In the example shown in the FIG. 13, the group common control channel (GCCCH) 1302 is transmitted using default numerology 1306. As part of the content of the GCCCH 1302, the structure of a regular control channel 1304 (including its numerology 1306, 1308, 1310) is signaled to the group of UEs. The numerology of the regular control channel 1304 can be different with the default numerology 1306. Also, as shown in the figure, the same structure/numerology of the regular control channel 1304 can be assigned to all the UEs in the group of UEs, or different structures/numerologies for the regular control channel 1304 can be assigned to different UEs or subgroups of UEs in the group of UEs.

Figure 14:
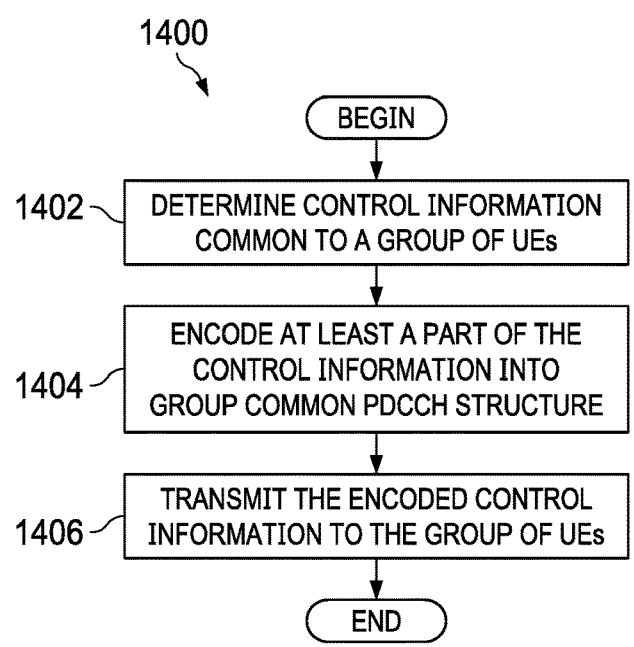
FIG. 14 is a flowchart of an embodiment of a method for transmitting group control information to a group of UEs.

FIG. 14 is a flowchart of an embodiment of a method 1400 for transmitting group control information to a group of UEs. The method 1400 includes, at step 1402, determining control information common to a group of user equipment (UEs). The method 1400 also includes, at step 1404, encoding the control information in a group common PDCCH to generate encoded control information. The method 1400 also includes, at step 1406, transmitting the encoded control information to the group of UEs.

In an embodiment, the control information includes time-frequency locations and numerologies for a plurality of data and control channels.

According to one aspect of the present disclosure, there is provided a method in a base station for signaling group common control channel information. The method includes determining control information common to a group of user equipment (UEs), the control information comprising time-frequency locations for at least one of a plurality of data channels and a plurality of control channels. The control information formatted in a Downlink Control Information (DCI) format. The method also includes encoding the control information in a group common control channel to generate encoded control information. The method also includes transmitting the encoded control information to the group of UEs.

According to one aspect of the present disclosure, there is provided a method in a base station for signaling group common Physical Downlink Control Channel (PDCCH) information. The method includes determining control information common to a group of user equipment (UEs). The control information includes group-scheduling information, resource configuration for downlink (DL) channel measurement, resource configuration for uplink (UL) channel measurement, group power control, and a group Ack/Nack for UL transmission by the UE-group. The control information is formatted in a Downlink Control Information (DCI) like format. The method also includes encoding the control information in a group common PDCCH to generate encoded control information. The method also includes transmitting the encoded control information to the group of UEs.

According to one aspect of the present disclosure, there is provided a base station for signaling group common control channel information. The base station includes a non-transitory memory storage comprising instructions and one or more processors in communication with the memory, wherein the one or more processors execute the instructions. The instructions include instructions for determining control information common to a group of user equipment (UEs), the control information comprising time-frequency locations for at least one of a plurality of data channels and a plurality of control channels. The control information is formatted in a Downlink Control Information (DCI) format. The instructions also include instructions for encoding the control information in a group common control channel to generate encoded control information. The instructions also include instructions for transmitting the encoded control information to the group of UEs.

According to one aspect of the present disclosure, there is provided a base station for signaling group common control channel information. The base station includes a non-transitory memory storage comprising instructions and one or more processors in communication with the memory, wherein the one or more processors execute the instructions. The instructions include instructions for determining control information common to a group of user equipment (UEs). The control information includes group-scheduling information, resource configuration for downlink (DL) channel measurement, resource configuration for uplink (UL) channel measurement, group power control, and a group Ack/Nack for UL transmission by the UE-group. The control information is formatted in a Downlink Control Information (DCI) like format. The instructions also include instructions for encoding the control information in a group common control channel to generate encoded control information. The instructions also include instructions for transmitting the encoded control information to the group of UEs.

According to one aspect of the present disclosure, there is provided a method in a user equipment (UE) for receiving group common control channel (GCCCH) information. The method includes receiving, at the UE, signaling from a base station. The signaling indicates an encoded control information. The encoded control information is encoded with a control information in a group common control channel. The control information includes time-frequency locations for at least one of a plurality of data channels and a plurality of control channels. The control information is formatted in a Downlink Control Information (DCI) format.

According to one aspect of the present disclosure, there is provided a user equipment (UE) for receiving group common control channel information. The UE includes a non-transitory memory storage comprising instructions and one or more processors in communication with the memory. The one or more processors execute the instructions for receiving signaling from a base station, a signaling indicating an encoded control information. The encoded control information is encoded with a control information in a group common control channel. The control information includes time-frequency locations for at least one of a plurality of data channels and a plurality of control channels. The control information is formatted in a Downlink Control Information (DCI) format.

Optionally, in any of the preceding aspects, another implementation of the aspect provides that the time-frequency location comprises a resource set indication.

Optionally, in any of the preceding aspects, another implementation of the aspect provides that the time-frequency location of a group common Physical Downlink Control Channel (PDCCH) is signaled to the group of UEs using a radio resource control (RRC) message or a System Information Block (SIB) message.

Optionally, in any of the preceding aspects, another implementation of the aspect provides that the time-frequency information includes any one of a resource set indication a default numerology, or a configurable numerology.

Optionally, in any of the preceding aspects, another implementation of the aspect provides that the group of UEs is associated with a UE group ID, wherein the UE group ID is signaled to the group of UEs in a radio resource control (RRC) message.

Optionally, in any of the preceding aspects, another implementation of the aspect provides that the method further includes receiving, by the UE, a UE group identifier (ID) in a radio resource control (RRC) message, and the UE group ID is associated with a group of UEs In an embodiment, a method in a base station for signaling group common control channel information includes determining control information common to a group of user equipment (UEs). The control information includes time-frequency locations for a plurality of data and/or control channels. The method also includes encoding the control information in a group common control channel to generate encoded control information. The method also includes transmitting the encoded control information to the group of UEs.

Optionally, in any of the preceding aspects, another implementation of the aspect provides that the encoded control information includes a Downlink Control Information (DCI) format.

Optionally, in any of the preceding aspects, another implementation of the aspect provides that the time-frequency location of the group common PDCCH is signaled to the group of UEs using RRC message or SIB message.

Optionally, in any of the preceding aspects, another implementation of the aspect provides that at least a portion of the encoded control information is transmitted in an L1 signaling message.

Optionally, in any of the preceding aspects, another implementation of the aspect provides that the time frequency information includes a resource set indication.

Optionally, in any of the preceding aspects, another implementation of the aspect provides that the time-frequency information includes a default numerology.

Optionally, in any of the preceding aspects, another implementation of the aspect provides that the time-frequency information includes a configurable numerology.

Optionally, in any of the preceding aspects, another implementation of the aspect provides that the control information further includes a bandwidth part and a numerology.

Optionally, in any of the preceding aspects, another implementation of the aspect provides that the numerology includes at least one of subcarrier spacing, cyclic prefix (CP) length, and transmission time interval (TTI) length.

Optionally, in any of the preceding aspects, another implementation of the aspect provides that the bandwidth part and the numerology structure are different for downlink and uplink.

Optionally, in any of the preceding aspects, another implementation of the aspect provides that the bandwidth part and the numerology structure are the same for downlink and uplink.

Optionally, in any of the preceding aspects, another implementation of the aspect provides that the bandwidth part and the numerology structure are partially signaled in the group common PDCCH and partially signaled in a System Information Block (SIB).

Optionally, in any of the preceding aspects, another implementation of the aspect provides that a UE group is determined according to UEs within a beam.

Optionally, in any of the preceding aspects, another implementation of the aspect provides that the group of UEs is associated with a UE group ID, the UE group ID determined according to a beam index and one of a hypercell ID or a physical cell ID.

Optionally, in any of the preceding aspects, another implementation of the aspect provides that the group of UEs is associated with a UE group ID, wherein the UE group ID is signaled to the group of UEs in a radio resource control (RRC) message.

In an embodiment, a method in a base station for signaling group common Physical Downlink Control Channel (PDCCH) information includes determining control information common to a group of user equipment (UEs). The control information includes group-scheduling information, resource configuration for downlink (DL) channel measurement, resource configuration for uplink (UL) channel measurement, group power control, and a group Ack/Nack for UL transmission by the UE-group. The control information is formatted in a Downlink Control Information (DCI) like format. The method also includes encoding the control information in a group common PDCCH to generate encoded control information. The method also includes transmitting the encoded control information to the group of UEs.

Optionally, in any of the preceding aspects, another implementation of the aspect provides that a time-frequency location of the group common PDCCH for the group of UEs includes a blind detection area.

Optionally, in any of the preceding aspects, another implementation of the aspect provides that the group-scheduling information includes downlink (DL) assignment and uplink (UL) grant.

Optionally, in any of the preceding aspects, another implementation of the aspect provides that the group-scheduling information includes a Modulation and Coding Scheme (MCS), an RV, precoding information for Multiple-Input, Multiple-Output (MIMO), spreading sequence/codebook set, and resource allocation for DL/UL data transmission.

Optionally, in any of the preceding aspects, another implementation of the aspect provides that time-frequency resources for uplink (UL) reference signal (RS) for channel measurement are indicated in the resource configuration.

In an embodiment, a base station for signaling group common control channel information includes a non-transitory memory storage including instructions and one or more processors in communication with the memory. The one or more processors execute the instructions for determining control information common to a group of user equipment (UEs). The control information includes time-frequency locations for a plurality of data and/or control channels. The one or more processors also execute the instructions for encoding the control information in a group common control channel to generate encoded control information. The one or more processor also execute the instructions for transmitting the encoded control information to the group of UEs.

Optionally, in any of the preceding aspects, another implementation of the aspect provides that the encoded control information includes a Downlink Control Information (DCI) format.

Optionally, in any of the preceding aspects, another implementation of the aspect provides that the time-frequency location of the group common control channel is signaled to the group of UEs using RRC message or SIB message.

Optionally, in any of the preceding aspects, another implementation of the aspect provides that at least a portion of the encoded control information is transmitted in an L1 signaling message.

Optionally, in any of the preceding aspects, another implementation of the aspect provides that the time frequency information includes a resource set indication.

Optionally, in any of the preceding aspects, another implementation of the aspect provides that the time-frequency information includes a default numerology.

Optionally, in any of the preceding aspects, another implementation of the aspect provides that the time-frequency information includes a configurable numerology.

Optionally, in any of the preceding aspects, another implementation of the aspect provides that the control information further includes a bandwidth part and a numerology structure.

Optionally, in any of the preceding aspects, another implementation of the aspect provides that the numerology includes at least one of subcarrier spacing, cyclic prefix (CP) length, and transmission time interval (TTI) length.

Optionally, in any of the preceding aspects, another implementation of the aspect provides that the bandwidth part and the numerology structure are different for downlink and uplink.

Optionally, in any of the preceding aspects, another implementation of the aspect provides that the bandwidth part and the numerology structure are the same for downlink and uplink.

Optionally, in any of the preceding aspects, another implementation of the aspect provides that the bandwidth part and the numerology structure are partially signaled in the group common control channel and partially signaled in a System Information Block (SIB).

Optionally, in any of the preceding aspects, another implementation of the aspect provides that a UE group is determined according to UEs within a beam.

Optionally, in any of the preceding aspects, another implementation of the aspect provides that the group of UEs is associated with a UE group ID, the UE group ID determined according to a beam index and one of a hypercell ID or a physical cell ID.

Optionally, in any of the preceding aspects, another implementation of the aspect provides that the group of UEs is associated with a UE group ID, wherein the UE group ID is signaled to the group of UEs in a radio resource control (RRC) message.

In an embodiment, a base station for signaling group common control channel information includes a non-transitory memory storage including instructions and one or more processors in communication with the memory. The one or more processors execute the instructions for determining control information common to a group of user equipment (UEs). The control information includes group-scheduling information, resource configuration for downlink (DL) channel measurement, resource configuration for uplink (UL) channel measurement, group power control, and a group Ack/Nack for UL transmission by the UE-group. The control information is formatted in a Downlink Control Information (DCI) like format. The one or more processor also execute the instructions for encoding the control information in a group common control channel to generate encoded control information. The one or more processors also execute the instructions for transmitting the encoded control information to the group of UEs.

Optionally, in any of the preceding aspects, another implementation of the aspect provides that time-frequency location of the group common PDCCH for the group of UEs includes a blind detection area.

Optionally, in any of the preceding aspects, another implementation of the aspect provides that the group-scheduling information includes downlink (DL) assignment and uplink (UL) grant.

Optionally, in any of the preceding aspects, another implementation of the aspect provides that the group-scheduling information includes a Modulation and Coding Scheme (MCS), an RV, precoding information for Multiple-Input, Multiple-Output (MIMO), spreading sequence/codebook set, and resource allocation for DL/UL data transmission.

Optionally, in any of the preceding aspects, another implementation of the aspect provides that time-frequency resources for uplink (UL) reference signal (RS) for channel measurement are indicated in the resource configuration.

In an embodiment, a method in a user equipment (UE) for receiving group common control channel (GCCCH) information includes receiving, at the UE, signaling from a base station. The signaling indicates a time-frequency location of a GCCCH. The method also includes receiving, at the UE, the GCCCH by performing blind detection in the time-frequency location of the GCCCH.

Optionally, in any of the preceding aspects, another implementation of the aspect provides that the signaling further includes indicating a UE group ID to the UE.

Optionally, in any of the preceding aspects, another implementation of the aspect provides that the GCCCH information includes time-frequency locations for a plurality of data and/or control channels.

Optionally, in any of the preceding aspects, another implementation of the aspect provides that the GCCCH information includes group-scheduling information, and/or resource configuration for uplink (UL) channel measurement, and/or group power control.

In an embodiment, the control information includes group-scheduling information, resource configuration for downlink (DL) channel measurement, resource configuration for uplink (UL) channel measurement, group power control, and a group Ack/Nack for UL transmission by the UE-group, the control information formatted in a Downlink Control Information (DCI) like format.

In an embodiment, a time-frequency location for the group of UEs comprises a blind detection area.

In an embodiment, the time frequency information comprises a resource set indication.

In an embodiment, the time-frequency information comprises a default numerology.

In an embodiment, the time-frequency information comprises a configurable numerology.

In an embodiment, the numerology includes at least one of subcarrier spacing, cyclic prefix (CP) length, and transmission time interval (TTI) length.

In an embodiment, the control information further comprises a bandwidth part and a numerology structure.

In an embodiment, the bandwidth part and the numerology structure are different for downlink and uplink.

In an embodiment, the bandwidth part and the numerology structure are the same for downlink and uplink.

In an embodiment, the bandwidth part and the numerology structure are partially signaled in the group common PDCCH and partially signaled in a System Information Block (SIB).

In an embodiment, a UE group is determined according to UEs within a beam.

In an embodiment, the group of UEs is associated with a UE group ID, the UE group ID determined according to a beam index and one of a hypercell ID or a physical cell ID.

In an embodiment, the group of UEs is associated with a UE group ID, wherein the UE group ID is signaled to the group of UEs in a radio resource control (RRC).

In an embodiment, the time-frequency location for the group of UEs comprises a blind detection area.

In an embodiment, the group-scheduling information includes downlink (DL) assignment and uplink (UL) grant.

In an embodiment, the group-scheduling information includes a Modulation and Coding Scheme (MCS), an RV, precoding information for Multiple-Input, Multiple-Output (MIMO), spreading sequence/codebook set, and resource allocation for DL/UL data transmission.

In an embodiment, time-frequency resources for uplink (UL) reference signal (RS) for channel measurement are indicated in the resource configuration.

According to one aspect of the present disclosure, there is provided a method in a base station for signaling group common Physical Downlink Control Channel (PDCCH) information. The method includes determining control information common to a group of user equipment (UEs). The control information includes at least one of group scheduling information, resource configuration for uplink (UL) channel measurement, and group power control. The control information is formatted in a Downlink Control Information (DCI) format. The method also includes encoding the control information in a group common PDCCH to generate encoded control information. The method also includes transmitting the encoded control information to the group of UEs.

Optionally, in any of the preceding aspects, the group power control includes power control for an UL data transmission or an UL control channel.

Optionally, in any of the preceding aspects, the method further includes signaling, by the BS, a UE group ID to a group of UEs in a radio resource control (RRC) message, wherein the UE group ID is associated with the group of UEs.

Optionally, in any of the preceding aspects, the method further includes transmitting, by the BS, a second encoded control information to the group of UEs; wherein the encoded control information carrying control information which indicates a time-frequency locations for at least one of a plurality of data channels and a plurality of control channels.

Optionally, in any of the preceding aspects, the control information formatted in a second DCI format.

According to one aspect of the present disclosure, there is provided a base station for signaling group common control channel information. The base station includes a non-transitory memory storage comprising instructions and one or more processors in communication with the memory. The one or more processors execute the instructions for determining control information common to a group of user equipment (UEs). The control information includes at least one of group-scheduling information, resource configuration for uplink (UL) channel measurement, and group power control. The control information is formatted in a Downlink Control Information (DCI) format. The one or more processors also execute the instructions for encoding the control information in a group common control channel to generate encoded control information. The one or more processors also execute the instructions for transmitting the encoded control information to the group of UEs.

Optionally, in any of the preceding aspects, the group power control includes power control for an UL data transmission or an UL control channel.

Optionally, in any of the preceding aspects, the base station further includes instruction for signaling a UE group ID to a group of UEs in a radio resource control (RRC) message, wherein the UE group ID is associated with the group of UEs Optionally, in any of the preceding aspects, the base station further includes instruction for transmitting a second encoded control information to the group of UEs; wherein the encoded control information carrying control information which indicates a time-frequency locations for at least one of a plurality of data channels and a plurality of control channels Optionally, in any of the preceding aspects, the control information formatted in a second DCI format.

According to one aspect of the present disclosure, there is provided a method in a user equipment (UE) for receiving group common Physical Downlink Control Channel (PDCCH) information. The method includes receiving, at the UE, an encoded control information from a base station. The encoded control information is encoded with a control information in a group common PDCCH. The control information includes at least one of group-scheduling information, resource configuration for uplink (UL) channel measurement, and group power control. The control information is formatted in a Downlink Control Information (DCI) format. The method also includes decoding, at the UE, the encoded control information.

Optionally, in any of the preceding aspects, the group power control includes power control for an UL data transmission or an UL control channel.

Optionally, in any of the preceding aspects, the method further includes receiving, by the UE, a UE group ID to the UE in a radio resource control (RRC) message, wherein the UE group ID is associated with the group of UEs.

Optionally, in any of the preceding aspects, the method further includes receiving, by the UE, a second encoded control information from the base station, wherein the encoded control information carrying control information which indicates a time-frequency locations for at least one of a plurality of data channels and a plurality of control channels.

Optionally, in any of the preceding aspects, the control information formatted in a second DCI format.

According to one aspect of the present disclosure, there is provided a user equipment (UE) for receiving group common Physical Downlink Control Channel (PDCCH) information. The UE includes a non-transitory memory storage comprising instructions and one or more processors in communication with the memory. The one or more processors execute the instructions for receiving an encoded control information from a base station. The encoded control information is encoded with a control information in a group common PDCCH. The control information includes at least one of group-scheduling information, resource configuration for uplink (UL) channel measurement, and group power control. The control information is formatted in a Downlink Control Information (DCI) format. The one or more processor also execute the instructions for decoding the encoded control information.

Optionally, in any of the preceding aspects, the group power control includes power control for an UL data transmission or an UL control channel.

Optionally, in any of the preceding aspects, the UE further includes instructions for receiving a UE group ID to the UE in a radio resource control (RRC) message, wherein the UE group ID is associated with the group of UEs.

Optionally, in any of the preceding aspects, the UE further includes instructions for receiving a second encoded control information from the base station; wherein the encoded control information carrying control information which indicates a time-frequency locations for at least one of a plurality of data channels and a plurality of control channels.

Optionally, in any of the preceding aspects, the control information formatted in a second DCI format.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by encoding or encoder unit/module, or a determination unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
   encoding, by a network device, control information to generate encoded control information, wherein the control information indicates time-frequency locations for at least one of a plurality of data channels and a plurality of control channels, the control information formatted in a downlink control information (DCI) format; and
   transmitting, by the network device, the encoded control information in a group common physical downlink control channel (PDCCH) using a configurable numerology,
   wherein the group common PDCCH is transmitted to a group of user equipments (UEs),
   wherein a plurality of group common PDCCHs including the group common PDCCH further comprise a second group common PDCCH, and the second group common PDCCH is transmitted to a second group of UEs using a second configurable numerology,
   wherein time-frequency location of the group common PDCCH is indicated using a resource set indication associated with the configurable numerology, and wherein the resource set indication associated with the configurable numerology comprises indication of at least one of:
      one or more symbols from an end of a slot or a subframe together with an entire bandwidth part associated with the configurable numerology,
      one or more symbols from the end of the slot together with a portion of a bandwidth part associated with the configurable numerology,
      one or more symbols from a middle of the slot or the subframe together with the entire bandwidth part associated with the configurable numerology, or
      one or more symbols from the middle of the slot together with the portion of the bandwidth part associated with the configurable numerology.

2. The method of claim 1, wherein the time-frequency location of the group common PDCCH is signaled to the group of UEs using a first radio resource control (RRC) message or a system information block (SIB) message.

3. The method of claim 1, the control information further comprising one of:
   group-scheduling information, resource configuration for downlink (DL) channel measurement, resource configuration for uplink (UL) channel measurement, group power control, or a group acknowledgment (ACK)/negative acknowledgement (NACK) for UL transmission by the group of UEs.

4. The method of claim 1, wherein a UE group identifier (ID) is signaled to the group of UEs in a second RRC message.

5. The method of claim 4, wherein the group common PDCCH further comprises the UE group ID.

6. A network device comprising:
   a non-transitory memory storage comprising instructions; and
   one or more processors in communication with the non-transitory memory storage, wherein the one or more processors execute the instructions for:
      encoding control information to generate encoded control information, wherein the control information indicates time-frequency locations for at least one of a plurality of data channels and a plurality of control channels, the control information formatted in a downlink control information (DCI) format; and transmitting the encoded control information in a group common physical downlink control channel (PDCCH) using a configurable numerology, wherein the group common PDCCH is transmitted to a group of user equipments (UEs), wherein a plurality of group common PDCCHs including the group common PDCCH further comprise a second group common PDCCH, and the second group common PDCCH is transmitted to a second group of UEs using a second configurable numerology, wherein time-frequency location of the group common PDCCH is indicated using a resource set indication associated with the configurable numerology, and wherein the resource set indication associated with the configurable numerology comprises at least one of:
- one or more symbols from an end of a slot or a subframe together with an entire bandwidth part associated with the configurable numerology,
- one or more symbols from the end of the slot together with a portion of a bandwidth part associated with the configurable numerology,
- one or more symbols from a middle of the slot or the subframe together with the entire bandwidth part associated with the configurable numerology, or
- one or more symbols from the middle of the slot together with the portion of the bandwidth part associated with the configurable numerology.

7. The network device of claim 6, wherein the time-frequency location of the group common PDCCH is signaled to the group of UEs using a first radio resource control (RRC) message or a system information block (SIB) message.

8. The network device of claim 6, the control information further comprising one of:
group-scheduling information, resource configuration for downlink (DL) channel measurement, resource configuration for uplink (UL) channel measurement, group power control, or a group acknowledgment (ACK)/negative acknowledgement (NACK) for UL transmission by the group of UEs.

9. The network device of claim 6, wherein a UE group identifier (ID) is signaled to the group of UEs in a second RRC message.

10. The network device of claim 9, wherein the group common PDCCH further comprises the UE group ID.

11. A method comprising:
receiving, by an apparatus, signaling from a network device in a group common physical downlink control channel (PDCCH) using a configurable numerology, the signaling indicating encoded control information; and decoding, by the apparatus, the encoded control information to generate control information, wherein the control information indicates time-frequency locations for at least one of a plurality of data channels and a plurality of control channels, the control information formatted in a downlink control information (DCI) format, wherein the group common PDCCH is transmitted to a group of user equipments (UEs), wherein a plurality of group common PDCCHs including the group common PDCCH further comprise a second group common PDCCH, and the second group common PDCCH is transmitted to a second group of UEs using a second configurable numerology, wherein time-frequency location of the group common PDCCH is determined using a resource set indication associated with the configurable numerology, and wherein the resource set indication associated with the configurable numerology comprises at least one of:
- one or more symbols from an end of a slot or a subframe together with an entire bandwidth part associated with the configurable numerology,
- one or more symbols from the end of the slot together with a portion of a bandwidth part associated with the configurable numerology,
- one or more symbols from a middle of the slot or the subframe together with the entire bandwidth part associated with the configurable numerology, or
- one or more symbols from the middle of the slot together with the portion of the bandwidth part associated with the configurable numerology.

12. The method of claim 11, wherein the time-frequency location information of the group common PDCCH is signaled to the group of UEs using a first radio resource control (RRC) message or a system information block (SIB) message.

13. The method of claim 11, the control information further comprising one of:
group-scheduling information, resource configuration for downlink (DL) channel measurement, resource configuration for uplink (UL) channel measurement, group power control, or a group acknowledgment (ACK)/negative acknowledgement (NACK) for UL transmission by the group of UEs.

14. The method of claim 11, wherein a UE group identifier (ID) is signaled to the group of UEs in a second RRC message.

15. The method of claim 14, wherein the group common PDCCH further comprises the UE group ID.

16. An apparatus comprising:
a non-transitory memory storage comprising instructions; and one or more processors in communication with the non-transitory memory storage, wherein the one or more processors execute the instructions for:
receiving signaling from a network device in a group common physical downlink control channel (PDCCH) using a configurable numerology, the signaling indicating encoded control information; and decoding the encoded control information to generate control information, wherein the control information indicates time-frequency locations for at least one of a plurality of data channels and a plurality of control channels, the control information formatted in a downlink control information (DCI) format, wherein the group common PDCCH is transmitted to a group of user equipments (UEs), wherein a plurality of group common PDCCHs including the group common PDCCH further comprise a second group common PDCCH, and the second group common PDCCH is transmitted to a second group of UEs using a second configurable numerology, wherein time-frequency location of the group common PDCCH is determined using a resource set indication associated with the configurable numerology, and wherein the resource set indication associated with the configurable numerology comprises at least one of:
- one or more symbols from an end of a slot or a subframe together with an entire bandwidth part associated with the configurable numerology,
- one or more symbols from the end of the slot together with a portion of a bandwidth part associated with the configurable numerology,
- one or more symbols from a middle of the slot or the subframe together with the entire bandwidth part associated with the configurable numerology, or
- one or more symbols from the middle of the slot together with the portion of the bandwidth part associated with the configurable numerology.

17. The apparatus of claim 16, wherein the time-frequency location of the group common PDCCH is signaled to the group of UEs using a first radio resource control (RRC) message or a system information block (SIB) message.

18. The apparatus of claim 16, the control information further comprising one of:
   group-scheduling information, resource configuration for downlink (DL) channel measurement, resource configuration for uplink (UL) channel measurement, group power control, or a group acknowledgment (ACK)/ negative acknowledgement (NACK) for UL transmission by the group of UEs.

19. The apparatus of claim 16, wherein a UE group identifier (ID) is signaled to the group of UEs in a second RRC message.

20. The apparatus of claim 19, wherein the group common PDCCH further comprises the UE group ID.

* * * * *

UNITED STATES PATENT AND TRADEMARK OFFICE
CERTIFICATE OF CORRECTION

PATENT NO. : 10,700,837 B2
APPLICATION NO. : 15/937559
DATED : June 30, 2020
INVENTOR(S) : Javad Abdoli et al.

Page 1 of 1

It is certified that error appears in the above-identified patent and that said Letters Patent is hereby corrected as shown below:

In the Claims

In Column 30, Line 23, Claim 12, delete "location information of the group" and insert --location of the group--.

Signed and Sealed this
Eighth Day of September, 2020

Andrei Iancu
*Director of the United States Patent and Trademark Office*